United States Patent
Mitra et al.

(10) Patent No.: US 12,506,550 B1
(45) Date of Patent: Dec. 23, 2025

(54) GENERATIVE MODEL FOR SINR ESTIMATION

(71) Applicant: Dell Products L.P., Round Rock, TX (US)

(72) Inventors: Jeebak Mitra, Ottawa (CA); Gwenael Poitau, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/827,197

(22) Filed: Sep. 6, 2024

(51) Int. Cl.
  *H04B 17/336* (2015.01)
  *H04B 17/391* (2015.01)

(52) U.S. Cl.
  CPC ....... *H04B 17/336* (2015.01); *H04B 17/3913* (2015.01)

(58) Field of Classification Search
  CPC .......................... H04B 17/336; H04B 17/3913
  See application file for complete search history.

(56) References Cited

U.S. PATENT DOCUMENTS

| | | | |
|---|---|---|---|
| 2020/0287639 A1* | 9/2020 | Su | H04L 1/0061 |
| 2022/0248312 A1* | 8/2022 | Bai | G06N 20/20 |

OTHER PUBLICATIONS

Blanquez-Casado, et al. "eOLLA: an enhanced outer loop link adaptation for cellular networks" EURASIP Journal on Wireless Communications and Networking (2016) 2016:20, 16 pages.
Schaul, et al. "Prioritized Experience Replay" ICLR 2016, arXiv:1511.05952v4 [cs.LG] Feb. 25, 2016, 21 pages.
Saxena, et al. "Reinforcement Learning for Efficient and Tuning-Free Link Adaptation" arXiv:2010.08651v2 [eess. SP] May 5, 2021, 30 pages.
3GPP "5G; NR; Physical layer procedures for data (3GPP TS 38.214 version 15.3.0 Release 15)", 3GPP, Oct. 2018, 99 pages.

* cited by examiner

*Primary Examiner* — Sung S Ahn
(74) *Attorney, Agent, or Firm* — Amin, Turocy & Watson, LLP

(57) ABSTRACT

Use of a data-driven approach that assimilates historical signal to interference-plus noise ratio (SINR) and channel estimation data along with location-map of the cell in which base station equipment is situated to better define the relationship between SINR and the user-channel environmental map and spatio-temporal changes to it to achieve more granular, cell site-specific modeling is disclosed herein. This data-driven approach estimates SINR using variational autoencoders. Variational encoders typically consist of two sections, an encoder section and decoder section. The encoder section learns the distribution on the low-dimensional latent space over the input data samples. The decoder section is a generative model that learns the joint distribution of the latent variables and input data.

20 Claims, 13 Drawing Sheets

Predicted SINRs for UEs based on location within cell and allocated sub-band

GENERATIVE MODEL FOR SINR ESTIMATION

REFERENCE TO RELATED APPLICATIONS

The subject patent application is related to U.S. patent application Ser. No. 18/827,170, filed Sep. 6, 2024, and entitled "DOWNLINK LINK ADAPTATION" and U.S. patent application Ser. No. 18/827,223, filed Sep. 6, 2024, and entitled "COMPENSATION OF OUTDATED CQI FOR LINK ADAPTATION", the entireties of which applications are hereby incorporated by reference herein.

BACKGROUND

Communication over wireless channels can be challenging due to the time-varying nature of the channel, whereby the signal properties can vary in the frequency (phase) and time domain (amplitude). This creates uncertainty in transmission as maintaining a constant target block error rate (BLER) can become difficult due to the sporadic fluctuations.

Link adaptation can be used in wireless communication systems to optimize (e.g., maximize) data transmission rates based on current conditions extant on a communication channel. Typically, link adaptation adjusts modulation schemes and coding rates, based, for instance, on the quality of communication links, as determined by BLERs, signal-to-noise ratios (SNRs) and/or bit error rates (BERs).

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
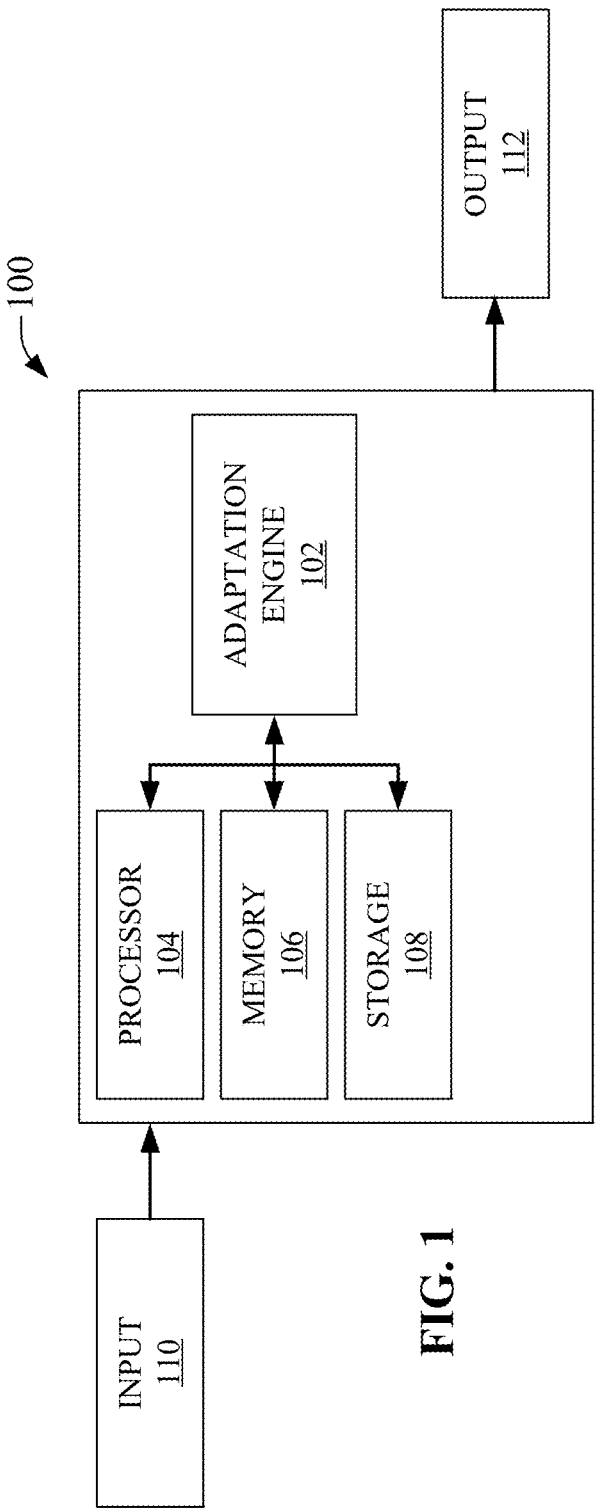
FIG. 1 illustrates a block diagram of a system for generative signal to interference plus noise ratio (SINR) estimation, in accordance with various non-limiting example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

In accordance with various example embodiments, a system, apparatus, or device is provided comprising: a processor; and a memory that stores executable instructions that, when executed by the processor, facilitate performance of operations. The operations can comprise: receiving historical signal-to-interference plus noise ratio data representing a cellular network infrastructure comprising sectors of a cellular network, channel estimation data representative of at least one performance of at least one communication channel established between the base station equipment and at least one user equipment connected via the cellular network, location map data representative of at least one location of the at least one user equipment, and user channel environmental map data representative of a spatio-temporal variation associated with one or more of at least one mobility of the at least one user equipment, at least one signal quality associated with the at least one user equipment, a network load associated with the cellular network, and at least one ambient environmental condition being experienced by the at least one user equipment, wherein the cellular network infrastructure is tessellated into a group of tiles based on the location map data, and wherein a first tile of the group of tiles overlaps a second tile of the group of tiles, using a convolutional neural network comprising a first layer representing at least one first convolutional layer, a second layer representing at least one second convolutional layer and a max-pooling layer, and a third layer representing at least one third convolutional layer and at least one activation layer, based on a result of using the convolutional neural network, generating respective signal-to-interference plus noise ratio measures for respective tiles of the group of tiles based on respective distributions of respective collections of different user equipment situated within respective sectors of the cellular network infrastructure and respective measured signal powers associated with the respective collections of different user equipment, wherein the respective collections of the different user equipment are located in the respective sectors of the cellular network infrastructure as tessellated into the group of tiles, using an up-sampling process to increase spatial dimensions of the cellular network infrastructure as tessellated into the group of tiles, and based on respective locations of the different user equipment, generating respective predicted signal-to-interference plus noise ratios for the different user equipment.

In regard to the foregoing, in some embodiments the channel estimation data comprises a channel quality indicator value indicative of a numeral representation of a channel quality associated with the at least one communication channel established between the base station equipment and the at least one user equipment.

In some embodiments the operations further comprise receiving rank indicator data indicative of a number of independent data streams capable of being concurrently transmitted using a single frequency resource associated with the at least one communication channel established between the base station equipment and the at least one user equipment, receiving, from the at least one user equipment, pre-coding matrix indicator data representative of at least one pre-coding matrix identified in at least one defined cookbook of pre-coding matrices that the base station equipment uses to communicate with the at least one user equipment, and receiving, from network equipment associated with the base station equipment, a group of time varying parameter values that remain constant for a defined number of transmission time intervals, wherein, after completion of the defined number of transmission time intervals, the group of time varying parameter values are changed.

In certain embodiments the operations comprise receiving, from network equipment, network prediction data indicative of network traffic patterns that have been determined based on historical network traffic patterns, current network traffic conditions, and an output from a machine learning model trained to generate the network prediction data, receiving, from network equipment, traffic shaping data representative of information associated with a current flow of data packets, and wherein the current flow of data packets is set to result in a threshold efficient utilization of cellular network resources according to a defined efficiency criterion, receiving, from the respective collections of different user equipment, a grouping of channel state information report data, and receiving, from the respective collections of different user equipment, radio frequency traffic demand data, and wherein the radio frequency traffic demand data comprises a numerical value representative of a number of the different user equipment within the respective collections of different user equipment that are executing network intensive application instances.

In accordance with further embodiments, the subject disclosure describes a method, comprising a sequence of acts that can include: receiving, by base station equipment comprising at least one processor, historical signal-to-interference plus noise ratio data representing a cellular network infrastructure comprising sectors of a cellular network, channel estimation data representative of at least one performance of at least one communication channel established between the base station equipment and at least one user equipment connected via the cellular network, location map data representative of at least one location of the at least one user equipment, and user channel environmental map data representative of a spatio-temporal variation associated with one or more of at least one mobility of the at least one user equipment, at least one signal quality associated with the at least one user equipment, network load associated with the cellular network, and at least one ambient environmental condition being experienced by the at least one user equipment, wherein the cellular network infrastructure is tessellated into a group of tiles based on the location map data, and wherein a first tile of the group of tiles overlaps a second tile of the group of tiles, using, by the base station equipment, a convolutional neural network comprising a first layer representing a first convolutional layer, a second layer representing a second convolutional layer and a max-pooling layer, and a third layer comprising a third convolutional layer and an activation layer, based on a result of using the convolutional neural network, generating, by the base station equipment, respective signal-to-interference plus noise ratio measures for respective tiles of the group of tiles based on respective distributions of respective collections of disparate user equipment situated within respective sectors of the cellular network infrastructure and respective measured signal powers associated with the respective collections of disparate user equipment, wherein the respective collections of the disparate user equipment are located in the respective sectors of the cellular network infrastructure as tessellated into the group of tiles, and based on respective locations of the disparate user equipment of the respective collections, generating, by the base station equipment, respective predicted signal-to-interference plus noise ratios for the disparate user equipment.

In many of the embodiments the channel estimation data comprises a channel quality indicator value indicative of a numeral representation of a channel quality associated with the at least one communication channel established between the base station equipment and the at least one user equipment.

In various embodiments the acts can further comprise receiving, by the base station equipment, rank indicator data indicative of a number of independent data streams capable of being simultaneously transmitted over a single frequency resource associated with the at least one communication channel established between the base station equipment and the at least one user equipment, receiving, by the base station equipment from the at least one user equipment, pre-coding matrix indicator data representative of at least one pre-coding matrix identified in at least one defined cookbook of pre-coding matrices that the base station equipment uses to communicate with the at least one user equipment, and receiving, by the base station equipment from network equipment associated with the base station equipment, a group of time varying parameter values that are maintained for a defined number of transmission time intervals, wherein, after completion of the defined number of transmission time intervals, the group of time varying parameter values are permitted to change, based on the respective predicted signal-to-interference plus noise ratios.

In additional embodiments further acts can comprise receiving, by the base station equipment from network equipment other than the base station equipment, network prediction data indicative of network traffic patterns that have been determined based on historical network traffic patterns, current network traffic conditions, and an output from a machine learning model trained to generate information usable to determine the network prediction data, and receiving, by the base station equipment from network equipment, traffic shaping data comprising information associated with a current flow of data packets, wherein the current flow of data packets is determined according to a function that results in at least a target efficiency of utilization of cellular network resources according to an efficiency metric.

In accordance with still further embodiments, the subject disclosure describes a machine-readable storage medium, a computer readable storage device, or non-transitory machine-readable media comprising instructions that, in response to execution, cause a computing system comprising at least one processor to perform operations. The operations can comprise: receiving historical signal-to-interference plus noise ratio data representing a cellular network infrastructure comprising sectors of a cellular network, channel estimation data representative of at least one performance of at least one communication channel established between the base station equipment and different user equipment connected via the cellular network, location map data representative of locations of the different user equipment, and user channel environmental map data representative of spatio-temporal variations associated with one or more of mobilities of the different user equipment, signal qualities associated with the different user equipment, a network load associated with the cellular network, and ambient environmental conditions being experienced by the different user equipment, wherein the cellular network infrastructure is tessellated into a group of tiles based on the location map data, and wherein a first tile of the group of tiles overlaps a second tile of the group of tiles, obtaining an output from a convolutional neural network comprising a first layer representing at least one first convolutional layer, a second layer representing at least one second convolutional layer and a max-pooling layer, and a third layer representing at least one third convolutional layer and at least one activation layer, based on the output from the convolutional neural network, generating respective signal-to-interference plus noise ratio measures for respective tiles of the group of tiles based on respective distributions of respective collections of the different user equipment situated within respective sectors of the cellular network infrastructure and respective measured signal powers associated with the respective collections of the different user equipment, wherein the respective collections of the different user equipment are located in the respective sectors of the cellular network infrastructure as tessellated into the group of tiles, and based on respective locations of the different user equipment of the respective collections, generating respective predicted signal-to-interference plus noise ratios for the different user equipment.

Additional operations can comprise receiving, from the respective collections of different user equipment, radio frequency traffic demand data, and wherein the radio frequency traffic demand data comprises a numerical value representative of the different user equipment within the respective collections that are executing network intensive application instances.

Maximizing user throughput is one of the primary objectives of the network optimization engines that have been adopted by mobile network operators (MNOs). An optimal resource allocation solution can be useful only if it can be determined and applied to network entities within its expected time. For contemporary wireless networks, such expected time (or real-time requirement) can be of the order of 1 ms or less. Therefore, higher layer radio access network (RAN) functions such as resource scheduling, mobility management, and radio resource management, tend to be static rule-based and are unable to adapt to the dynamics of the network or the variations in user demand that is anticipated for the various use cases for fifth generation (5G) new radio (NR) including private wireless network implementations catering to, for instance: (i) the Fourth Industrial Revolution (Industry 4.0)—an ongoing transformation in manufacturing and related industries through the adoption of digital technologies, characterized by the integration of cyber-physical systems, the Internet of Things (IoT), cloud computing; and (ii) immersive mixed-reality applications—applications that blend the physical and digital worlds to create highly interactive and engaging experiences, encompassing both augmented reality (AR), which overlays digital content onto the real world, and virtual reality (VR), which creates entirely virtual environments. Such applications demand dynamic provisioning of networks in a heretofore unprecedented manner and thus requires adding intelligence to the RAN functions to assist in the decision making process. The overall expectation is that of leading to improved user experience and more efficient network resource utilization.

Additionally, in regard to maximizing user throughput, a resource allocation solution is useful only if it can be determined and applied to the network entities within its expected time. For contemporary wireless networks, such expected time (or real-time requirement) can be of the order of 1 ms or less. Therefore, higher layer RAN functions such as resource scheduling, mobility management, and radio resource management, currently tend to be static rule-based and are unable to adapt to the dynamics of the network or variations in user demand that is anticipated for the various use cases for 5G NR implementations. Link adaptation is the functionality that is designed to select appropriate transmission parameters, e.g., the modulation and coding scheme (MCS), based on the instantaneous wireless channel to provide high transmission efficiency. However, link adaptation is only optimal if the information it receives to make such decisions are accurate. In a wireless environment various impairments and finite processing delays imply inaccuracies in obtaining channels state information either due to computational limitations or due to feedback delay. Example embodiments proposed as part of this disclosure help address these deficiencies in obtaining useful channel information.

The dramatic increase in cellular network traffic has meant the use of higher frequency bands and wider bandwidths for mobile communication networks. However, in lower bands (e.g., sub-6 gigahertz (GHz)), spectrum availability continues to be limited and since this continues to be the primary band generally used by commercial MNOs around the world more efficient means of network resource utilization are imperative for 5G and advanced networking implementations. Both resource allocation and energy management and wireless communication systems require accurate traffic analysis and prediction. In accordance with disclosed embodiments, by proactively estimating the future traffic load, mobile network operators can dynamically allocate network resources and can improve the spectral and energy efficiencies. Predicting cellular traffic at a fine granularity is an important but challenging endeavor due to the time varying and load-dependent behavior of traffic demand. Actual traffic demand can further be dependent on many factors, such as time of the day, day of week, special events, public holidays, and other seasonal events. Also, cellular traffic load can be location dependent, wherein traffic loads at different base station (BS) equipment can vary significantly due to user behavior and quality of service (QoS) requirements from different user applications hosted on user equipment (UE).

Further, with the increase in cellular network traffic, the use of higher frequency bands and wider bandwidths for mobile communication networks has been necessitated. However, in lower frequency bands (e.g., sub-6 GHz), spectrum availability continues to be limited and since these lower frequency bands continue to be primary frequency bands used by MNOs around the world are a more efficient means of network resource utilization are imperative for 5G and beyond.

As mentioned above, link adaptation (LA) is a technique/process that can be used in wireless communication systems to, for example, optimize (e.g., maximize) data transmission rates based on the current channel conditions being experienced while using wireless communication infrastructure associated with a mobile network operator (MNO) entity to communicated with user equipment. In general, link adaptation dynamically adjusts modulation schemes and coding rates based, for example, on the quality of communication links, as determined by signal-to-noise ratios (SNRs) and/or bit error rates (BERs).

Common modulation schemes so far have included quadrature amplitude modulation (QAM), phase shift keying (PSK), and frequency shift keying (FSK), and the like. Higher-order modulation schemes, such as 64-QAM, can transmit more bits per symbol but can also require higher SNRs (e.g., the propagated signal is much stronger in relation to noise) to maintain reliability. Coding rates can refer to adding redundancy to the transmitted data using error-correcting codes (ECC) such as convolutional codes (e.g., error-correcting codes used in digital communication systems to enhance the reliability of data transmissions—they work by adding redundant information to the transmitted data, which allows the receiver to detect and correct errors that may occur during transmission) or Turbo codes (e.g., high-performance error-correcting codes used to achieve performance approaching the theoretical maximum efficiency of a communication channel). It should be observed that higher coding rates can mean less redundancy than lower data rates but higher coding rates can nonetheless be less robust to errors compared to lower coding rates. A code rate is generally the ratio of the number of input bits to the number of output bits—a code rate of ½ means that each input bit is encoded into two output bits; typical code rates are ½, ⅓, ⅔, and the like.

Link adaptation can potentially be designed to target any objective provided a defined or definable BLER target is not being breached. A BLER is commonly determined as being a ratio of the number of incorrectly received data blocks to the total number of transmitted blocks over a determined communication channel. A block can be considered incorrect where one or more bits within the block are erroneous, despite error correction attempts. Link adaptation in the past has used several criterion such as throughput maximization, transmit power control, and the like have been considered as preferred objectives under the BLER constraint. For link adaptation schemes in the past, the dimensions that were explored have included adaptive modulation and coding. Adaptive modulation coding schemes are techniques and/or processes designed to enhance the efficiency and reliability of data transmissions by dynamically adjusting the modulation scheme and coding rate based on determined extant channel conditions. Adaptive modulation coding optimizes the balance between data rate and error performance.

Other dimensions that have been explored include the selection of appropriate multiple input multiple output (MIMO) pre-coding schemes. MIMO pre-coding employs techniques and/or processes that improve data transmission rates and reliability by leveraging multiple antennas at both the transmitter end and receiver end to exploit spatial diversity and spatial multiplexing. Pre-coding is generally concerned with the processing applied at the transmitter side to manage and optimize the transmitted signals, and transmit power control.

Additional dimensions that have previously been explored have included transmit power control for link adaptation. Transmit power control is a technique used to dynamically adjust the transmit power of a transmitted signal in order to optimize link performance, such that when transmit power control is combined with link adaptation strategies for instance adaptive modulation and coding schemes, the transmit power control aspects enhance the efficiency and reliability of communications. Processes associated with transmit power control typically adjust the power level of transmitted signals to achieve desired communication performance metrics, thereby aiding in managing interference, conserving energy, and maintaining link quality. Use of link adaptation strategies in conjunction with transmit power control methodologies provides for dynamic adjustment of communication parameters (e.g., modulation schemes, coding rates) based on current channel conditions. Link adaptation can maximize throughput while ensuring reliability and minimizing error rates.

Fifth generation new radio (5G NR) is the global standard for a unified, more capable cellular wireless air interface. The key benefits of 5G NR are faster data rates and improved capacity for mobile users; extremely low latency and high reliability; supports vastly more connected devices, such as IoT devices, with efficient, low-power connectivity; utilizes a wide range of spectrum bands, including sub-6 GHz and millimeter-wave frequencies, providing both extensive coverage and high capacity; enhances signal quality and network capacity through use of massive MIMO and beamforming; allows the creation of multiple virtual networks on a single physical network infrastructure, each of the multiple virtual networks can be tailored to specific requirements of different applications or services; and can reduce energy consumption for both devices and network infrastructure, which can be important for sustainability and cost reduction. Additionally, 5G NR provides faster downloads and uploads, improved streaming quality, and better overall user experience; reduces latencies for applications requiring real-time feedback, such as gaming, augmented reality and visual reality, and autonomous vehicles; support for more networking equipment per cell; and provides enhanced coverage and connectivity, especially in dense urban areas and remote locations.

5G NR in implementation can add additional degrees of freedom such as: scalable numerology (e.g., a flexible framework that allows for various subcarrier spacing and slot durations to efficiently support a wide range of services with different performance requirements); bandwidth parts (e.g., allowing networking and/or networked equipment to operate on a portion of a carrier bandwidth—a frequency range over which a single carrier signal can operate through use of subcarrier spacing, slot duration, and/or adaptable flexible frame structures); and hybrid beam forming (e.g., methodologies to enhance signal quality, increase capacity, and improve spectral efficiency by combining both analog and digital beam forming methods to leverage their respective advantages and mitigate their limitations). These additional degrees of freedom have nevertheless led to a multi-dimensional link adaptation problem that can be significantly complex to adequately resolve.

While machine learning based approaches have been applied to the link adaptation problem, these approaches have required huge training data sets in order to capture a broad range of channel conditions. Moreover, many of the proposed techniques to resolve the multi-dimensional nature of the link adaptation problem have placed heavy reliance on channel quality indicators provided as feedback by UE to be faultless (e.g., the channel quality indicators supplied as feedback fails to take into consideration unaccounted delays and errors). Further, link adaptation can significantly benefit from aperiodic reporting (e.g., networking equipment sends measurement or status reports to the network on a non-regular, on-demand basis), however, despite the manifold benefits of aperiodic reporting, prior machine learning solutions in order to keep system overhead low have avoided the using the concept of aperiodic reporting.

Networking equipment with multiple operational modes need to choose the best mode out of several possible modes of operation in order to optimize (e.g., maximize or minimize) system driven objective functions. In order to achieve this, this disclosure provides systems and/or methods to generate data to facilitate link adaptation with automated optimization capabilities, wherein transmission parameters are determined, identified, and/or selected in order to maximize the number of successfully transmitted bits per unit time within specified latency limits.

UE periodically send instantaneous channel quality indicator values to provide BS equipment, responsible for servicing the UE, indications of the current downlink channel quality. The UE can estimate the instantaneous signal to interference-plus noise ratio (SINR) from the radio signal in the process of removing several time varying impairments that can affect the transmitted signal, which is thereafter used to generate the instantaneous channel quality index value being a mapping function, such as:

$$CQI=\varphi(\gamma)\in\{0,1,\ldots,K\},$$

where $\varphi(\cdot)$ is a function that maps the SINR into a quantized channel quality information (CQI) value.

However, the CQI feedback can be inaccurate due to several factors, such as quantization errors, computation and transmission delays, as well as infrequent reporting.

Moreover, with the varying nature of 5G application scenarios, optimizing the scheduling for throughput alone only partially resolves these issues. Therefore, more versatile scheduling capabilities are needed for high performance products.

The methods and systems described herein apply in general to any orthogonal frequency division multiple access (OFDMA) system in general and more particularly to the downlink (DL) of cellular systems equipped with multiple antennas. OFDM is a digital modulation/multiplexing scheme known as orthogonal frequency division multiplexing, and is generally used in wireless communication systems, such as long-term evolution (LTE) and 5G (NR) systems, to enhance data transmission efficiency and network capacity.

Figure 5:
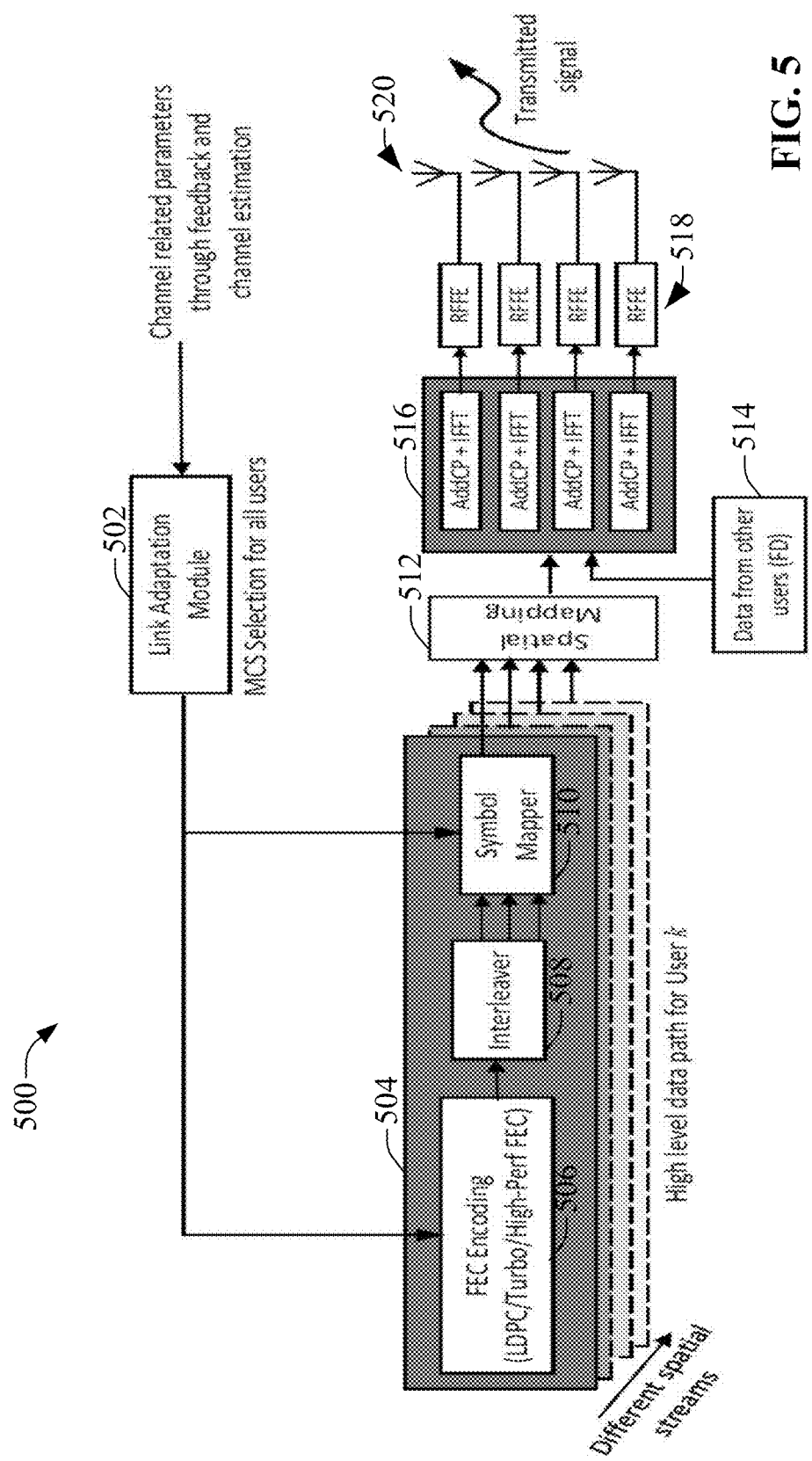
FIG. 5 depicts a block diagram for downlink data path of a wireless base station, in accordance with various non-limiting example embodiments.

For generic multiple input multiple output orthogonal frequency division multiplexing (MIMO-OFDM) systems with $N_{tx}$ transmit antennas and with UE using $N_x$ receiver antennas the baseband processing is depicted in FIG. 5.

FIG. 5 illustrates a system 500 for down link adaptation in accordance with example embodiments. System 500, in some example embodiments, depicts a typical data and control flow of an Orthogonal Frequency Division Multiplexing-based Physical (OFDM-based PHY) layer situated at BS equipment considering four transmit antennas 520. System 500 comprises a link adaptation module 502 (e.g., adaptation engine 102) that can receive as input, from networking equipment, channel related parameter values through feedback (a) from the networking equipment, (b) from one or more UE in operative communication with the BS equipment, and/or (c) parameter values determined, based at least on the channel related parameter values, by using one or more channel estimation process (e.g., processes that enables receiver equipment to accurately detect and decode transmitted signals by compensating for the effects of the wireless channel). Link adaptation module 502 can provide distinct modulation and coding schemes (MCSs) for all equipment (e.g., UE, networking equipment, internet of things (IoT) equipment, etc.) within the broadcast purview of system 500. Link adaptation module 502 can provide individuated MCSs by determining modulation types and coding rates for data transmission for each equipment within the control purview of system 500. In providing MCSs, link adaptation module 502 can balance data rates and reliability based on channel conditions, enabling efficient and robust communication between all communication equipment within the control ambit of 500. By adapting the MCS dynamically, system 500 can optimize performance to meet the varying demands of different applications and environments.

Once link adaptation module 502 has provided/generated an MCS data for a defined UE (e.g., user k), the data can be transmitted to the UE via one or more different spatial streams associated with the UE, wherein each of one or more different spatial streams can comprise a high level data path (e.g., 504) associated with the UE. Each high level path can comprise: a forward error correction (FEC) encoding component 506 that can be executable code in execution used in telecommunications and data storage to improve the reliability of data transmission and storage. The FEC encoding component can generally operate by adding redundant data (error correction codes) to original data (e.g., received data) so that errors can be detected and corrected without needing to retransmit the original data. Example FEC codes that can be used by FEC encoding component 506 can comprise low-density parity-check (LDPC) error-correcting codes, Turbo codes capable of providing error correction performance close to the theoretical maximum efficiency of a communication channel (e.g., the Shannon limit), and other high-performance FEC coding schemes, such as Polar codes (e.g., an encoding scheme capable of achieving capacity-approaching performance for a wide range of channels), Reed-Solomon codes (e.g., block-based FEC encoding generally used in data transmission and storage systems), Bose-Chaudhuri-Hocquenghem codes (e.g., a class of cyclic error-correcting codes capable of correcting multiple random error patterns), etc.

Thereafter, the result of the FEC encoding component can be directed to an interleaver component 508. Interleaver component 508 can be a defined hardware device (inclusive of processors) and/or a process in execution on a generic device comprising at least one processor. Interleaver component 508 can typically be used to rearrange the order of a sequence of data in a predefined manner. The primary purpose of rearranging the order of the sequence of data is to protect the data from burst errors, which are errors that can occur in clusters and can affect consecutive bits and/or symbols in a stream of bits and/or symbols.

Additionally, each high level path 504 can also comprise a symbol mapper component 510 that converts binary data (bits) into symbols that can be transmitted over a communication channel. These symbols can be representative of complex numbers or points in a signal constellation diagram—a graphical representation of the complex symbols used in digital modulation schemes. The signal constellation diagram plots the possible signal values (constellations) on a complex plane, where the x-axis can represent an in-phase component (I) and the y-axis can represent a quadrature component (Q). Each point on the signal constellation diagram can correspond to a specific symbol that can be transmitted. It should be noted symbol mapper component

510, in some embodiments, can be referred to as being a modulator or encoder, is a crucial component in digital communication systems.

Once the symbol mapper component 510 has converted the binary data (bits) into symbols that can be transmitted over a communication channel, the transmissible symbols can be sent to spatial mapping component 512. Spatial mapping component 512, particularly spatial mapping components in multiple-input multiple-output (MIMO) systems, can distribute the transmitted signal across multiple antennas (e.g., in this example four antennas). The process of spatial mapping can enhance data transmission rates, reliability, and overall performance of wireless communication systems, such as system 500. The result of the distribution by spatial mapping component 512, together with additional data from other UE that can be operational in the frequency domain (FD) 514, can be supplied to a cyclic prefix (CP) and Inverse Fast Fourier Transform (IFFT) component 516 to protect against inter-symbol interference (ISI) and inter-carrier interference (ICI) caused by multipath propagation and to convert signal from a frequency domain representation into a time domain representation. A cyclic prefix can act as a buffer region that helps maintain the orthogonality of the subcarriers (e.g., an individual frequency channel used in multicarrier modulation schemes, wherein each subcarrier carries a portion of the total data stream, allowing for parallel data transmission) in an OFDM signal, ensuring robust and efficient data transmission. The IFFT is typically used to generate a time-domain signal from frequency-domain data.

The result of cyclic prefix (CP) and inverse fast Fourier transform (IFFT) component 516 can be directed to radio frequency front end (RFFE) equipment 518. Generally, RFFE equipment 518 comprises the components and circuitry that handle the radio frequency signals before they are processed by a main transceiver or baseband processing unit. The RFFE can comprise: (i) RF filters that filter out unwanted frequencies or noise from signals, ensuring that only the desired frequency components are processed; (ii) mixers that combine and/or convert signals by mixing the RF signal with a local oscillator signal (a stable, precise signal generated at a specific frequency, used to convert signals from one frequency to another through the process of mixing) to shift the frequency; (iii) attenuators that reduce the signal power to prevent overloading of subsequent stages or to adjust signal levels for optimal performance; and (vi) diplexers and duplexers that separate or combine different frequency bands to allow simultaneous transmission and reception or to handle multiple frequency bands.

After processing by RFFE equipment 518 has completed, the signals can be sent to antennas that can broadcast/transmit the wireless signal.

Figure 6:
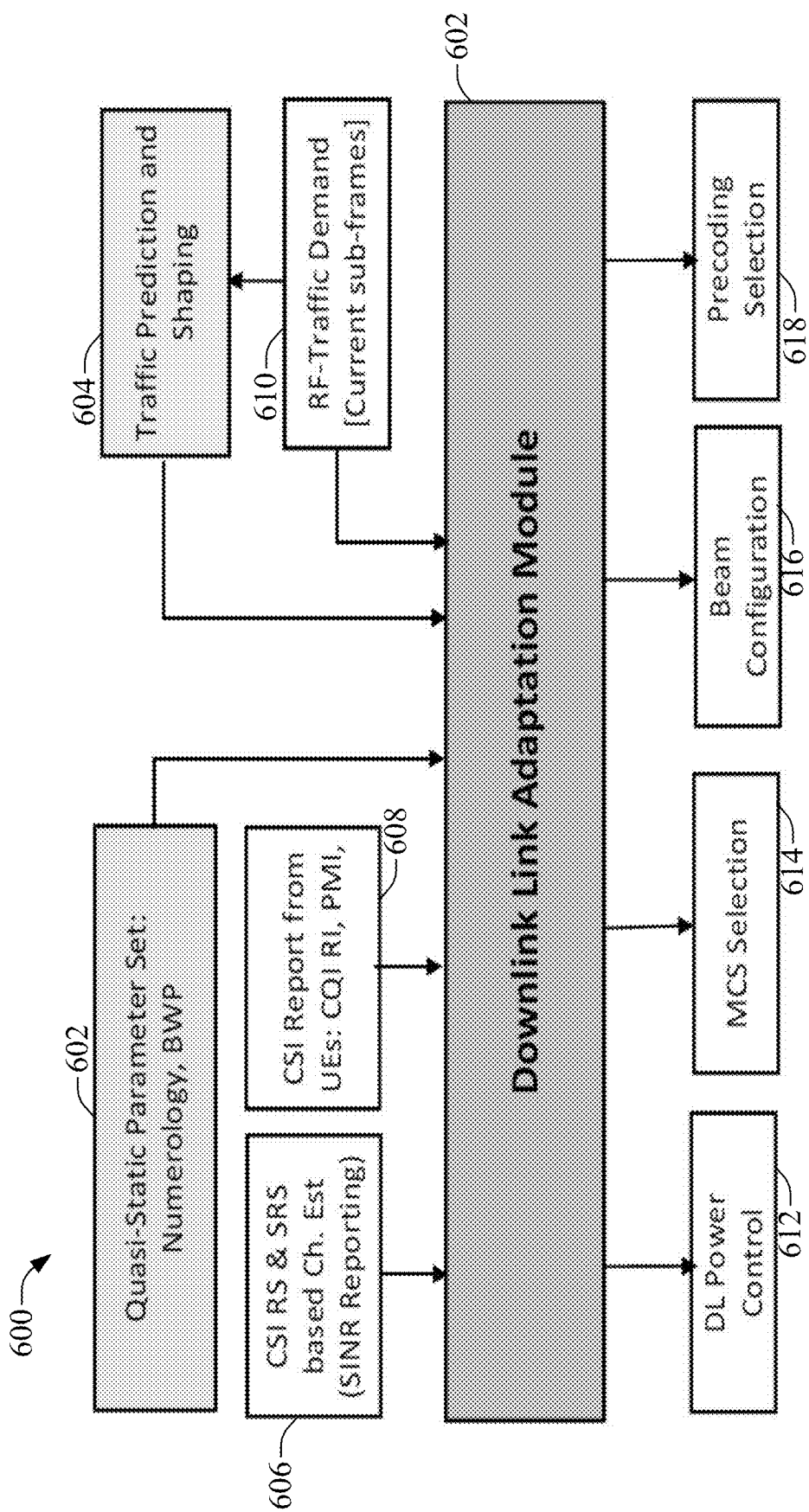
FIG. 6 illustrates inputs and outputs of a downlink adaptation module in accordance with various non-limiting example embodiments.

FIG. 6 provides a functional diagram 600 of downlink adaptation module 502 in accordance with many example embodiments. Downlink adaptation module 502 can receive a group of inputs that can be used to determine link adaptation policies, and output a group of outputs that can be used to configure parameters for UE within the control ambit of networking equipment, such as BS equipment. Some example input data can comprise: (a) groups of time varying parameters, values or characteristics 602 that generally change very slowly compared to the dynamic processes of interest, time varying parameters typically refer to channel characteristics that are assumed to be constant over a short period or over a certain number of transmissions but may change over longer periods; (b) traffic prediction and shaping data 604, this data can be influenced by various factors including the number of users, types of applications being used, time of day, and geographic location; (c) channel state information reference signal (CSI-RS) data and/or sounding reference signal (SRS) data 606, reference signals used in wireless communication systems, particularly in fourth generation (4G) long-term evolution (LTE) and 5G NR, and that enable efficient channel estimation, link adaptation, and network optimization; (d) channel state information (CSI) report data from a plethora of UE, channel quality information (CQI) data, rank indicator (RI) data (e.g., a measure used in MIMO systems to indicate the number of independent data streams (or layers) that can be transmitted simultaneously over the same frequency resources between a transmitter (e.g., BS equipment) and a receiver (e.g., UE), pre-coding matrix indicator (PMI) data (e.g., data that is a part of the channel state information (CSI) report data returned by UE to the BS equipment, indicative of which pre-coding matrix from a predefined codebook should be used to transmit data to the UE) 608; and (e) radio frequency traffic demand data 610—data that can also be influenced by various factors including the number of users, types of applications being used, time of day, and geographic location. In regard to radio frequency traffic demand data 610, this data can be an input to generate the traffic prediction and shaping data 604.

The group of parameter values that can change every few sub-frames 602 and can include values associated with: channel gain (the attenuation or amplification of signals as the propagate through a channel); path loss (the reduction in power density of a signal as it travels from transmitter to receiver); shadow fading (caused by large obstacles such as buildings and hills obstructing a signal path); Doppler shift (resulting from the relative motion between the transmitter and receiver, leading to a frequency shift in the received signal); and/or interference levels (levels of unwanted signals from other transmitters operating in the same or adjacent frequency bands).

Traffic prediction and traffic shaping are processes that improve the efficiency and reliability of data transmission in communication networks. Traffic prediction involves forecasting future network traffic patterns based on historical data, current conditions, and statistical or machine learning models. Accurate traffic prediction enables proactive network management and optimization. Traffic shaping, also known as packet shaping, is a network management technique that controls the flow of data packets to ensure efficient utilization of network resources and to meet specific performance criteria. Traffic shaping can entail delaying and/or dropping packets to regulate the data transmission rate.

CSI-RS data and SRS data 606 are two distinct data values, where CSI-RS data values are reference signal values transmitted by BS (such as a gNodeB in 5G or eNodeB in LTE) to provide precise channel state information to UE, and SRS data values are uplink reference signal values transmitted by the UE to the BS, providing information about the uplink channel conditions.

CSI-RS data can be used by the UE to measure the channel quality, which can be reported back to the BS for link adaptation and scheduling decisions. CSI-RS data can effectuate and/or facilitate beam forming, allowing the BS to focus the transmission beam towards the UE, thereby improving signal strength and reducing interference. In multiple-input multiple-output (MIMO) systems, CSI-RS data can be used for accurate channel estimation for multiple antennas, enabling advanced MIMO techniques.

SRS data can be used by the BS to assess the quality of the uplink channel, enabling uplink link adaptation, power control, and scheduling. SRS data can also be used to effectuate and/or facilitate in beam forming, allowing the BS to optimize the reception beam towards the UE. Further SRS data can provide channel information for uplink MIMO and enables frequency-selective scheduling by indicating which frequency bands have better channel conditions.

Downlink adaptation module 502 in response to receiving the groups of time varying parameters, values or characteristics 602; traffic prediction and shaping data 604; CSI-RS data and/or SRS data 606; channel state information (CSI) report data 608; and/or radio frequency traffic demand data 610 can generate a group of outputs that can be used to configure parameters for various UE based on, for example, channel conditions for each user equipment, and traffic demand of each UE. As depicted in FIG. 6, the output of downlink adaptation module 502 can comprise downlink (DL) power control parameter values 612, MCS selection parameter values 614, beam configuration parameter values 616, and pre-coding selection parameter values 618.

DL power control parameter values 612 these are values that optimize network performance, enhance user experience, and efficiently use available resources. Some of the objectives attributable to DL power control are to maximize signal quality thereby ensuring that the received signal at the UE is strong enough for reliable communication without causing excessive interference, minimizing interference by reducing the power of signals in such a way that they do not interfere with neighboring cells or users, optimizing battery life by lowering power levels to reduce a UE's power consumption, thereby extending battery life, and/or adjusting power levels to use spectrum resources more efficiently and to increase the overall network capacity.

MCS selection parameter values 614 these values are selected by choosing an appropriate combination of modulation order and coding rate based on the current channel conditions. The goal of MCS selection is to maximize data throughput while maintaining an acceptable level of transmission reliability. Illustrative parameters can comprise (i) CQI values a measure reported by the UE that indicates the quality of the downlink channel, wherein higher CQI values suggests better channel conditions, allowing for higher-order modulation and higher coding rates. Conversely, lower CQI values are indicative of poorer channel conditions, necessitating lower-order modulation and lower coding rates to ensure reliable communication; (ii) signal-to-noise ratio (SNR)/signal-to-interference-plus-noise ratio (SINR) values, a measure that provides the strength of the signal relative to the background noise and interference, wherein higher SNR/SINR values support the use of higher-order modulation schemes and higher coding rates, while lower values require more robust schemes to mitigate the effects of noise and interference; (iii) RI values that indicates the number of independent data streams that can be simultaneously transmitted over the MIMO channel, wherein higher RI value can enable the use of spatial multiplexing, increasing the data rate; (iv) PMI values that indicate an optimal pre-coding matrix for the MIMO transmission based on the channel conditions, wherein a defined pre-coding matrix can influence the effectiveness of different MCS combinations, particularly in MIMO systems; (v) CSI values can be a comprehensive set of parameters (e.g., CQI, RI, PMI) that describe the current state of the communication channel, wherein accurate and timely CSI enables better MCS selection by providing a complete picture of the channel conditions; (vi) hybrid automatic repeat request (HARQ) data generated by a HARQ protocol for error correction that combines retransmissions of data with forward error correction, wherein the outcome of HARQ feedback (success or failure) influences subsequent MCS selection, such that if previous transmissions have failed, a more robust MCS might be chosen for retransmissions; and/or (vii) feedback delay data, the delay between the UE measuring the channel and the BS receiving the feedback, wherein longer feedback delays can lead to channel information being considered outdated, necessitating more conservative MCS choices to account for potential changes in channel conditions.

Beam configuration parameter values 616 are crucial in modern wireless communication systems, particularly in technologies like LTE-Advanced and 5G NR, which utilize advanced beam-forming techniques. Beam-forming involves directing the transmission and reception of signals in specific directions to enhance signal quality, reduce interference, and increase overall system capacity. Example beam configuration parameters can comprise: beam-forming type, such as analog beam-forming that uses phase shifters to adjust the phase of the signal at each antenna element, forming a single beam, digital beam-forming that involves digital signal processing to control the amplitude and phase of the signal at each antenna element, allowing for multiple beams and more precise control, and hybrid beam-forming that combines both analog and digital techniques, balancing complexity and performance. Other beam-forming parameters can include the number of beams indicative of how many beams can be formed simultaneously. More beams can support more users or provide better coverage but require more sophisticated hardware and processing. Additional beam-forming parameters can be beam width values that refer to the angular spread of the beam—narrow beams can focus power more precisely, reducing interference and increasing gain but may require more beams to cover the same area. Beam steering range values provides a range of angles over which the beam can be steered, wider steering ranges provide more flexibility in directing the beam towards different UE or regions. Additionally, a predefined set of beam-forming vectors used to steer the beams, known as a beam-forming codebook, that can be used for beam selection and switching based on channel conditions and user locations.

Pre-coding selection parameter values 618 that can be used to transform a transmitted signal in a way that takes advantage of the spatial properties of the MIMO channel. Pre-coding selection parameters help determine the most suitable pre-coding matrix to optimize transmissions.

Channel quality reporting and SINR estimation are much more frequent acts and can possibly be performed every sub-frame based on system capability. In regard to channel quality reporting and SINR estimation, the exact periodicity of such reporting can also be limited by system capabilities, thus larger periods such as tens or hundreds of sub-frame intervals is also possible to reduce system complexity. Additionally, it should also be observed that for the output which MCS selection can potentially change every sub-frame, setting the DL power, beam configuration and pre-coding selection may not be as frequent and the triggers for these can be definable by a system design identity.

While estimating the SINR is quite important for proper link adaptation, often times it is quite difficult to do this in real-time for the entire bandwidth due to several reasons: accurate channel estimates often require matrix inversions or implementation of methods that solve them algebraically that are still computed intensive, SINR estimation for a wide-band with sparse pilots only can lead to inaccuracy in estimation for most channels except for the ideal case of frequency flat channels, and in most cases the closed formal empirical methods for SINR distribution, a popular approach to do so is to use log-normal distribution with parameters adjusted per deployment environment:

$$P(u_k) = P_0 - 10 * w_k \log_{10}\left(\frac{\|r_k - s_k\|^2}{d_k}\right) + n_k$$

These, however, only work for a small set of scenarios and the opportunity to derive more accurate SINRs from relevant adjacent information is missed.

A more accurate estimate might be possible by using ray tracing approaches but these can be extremely and complex to obtain in real-time and are better suited to pre-deployment or off-line analysis.

Figure 7:
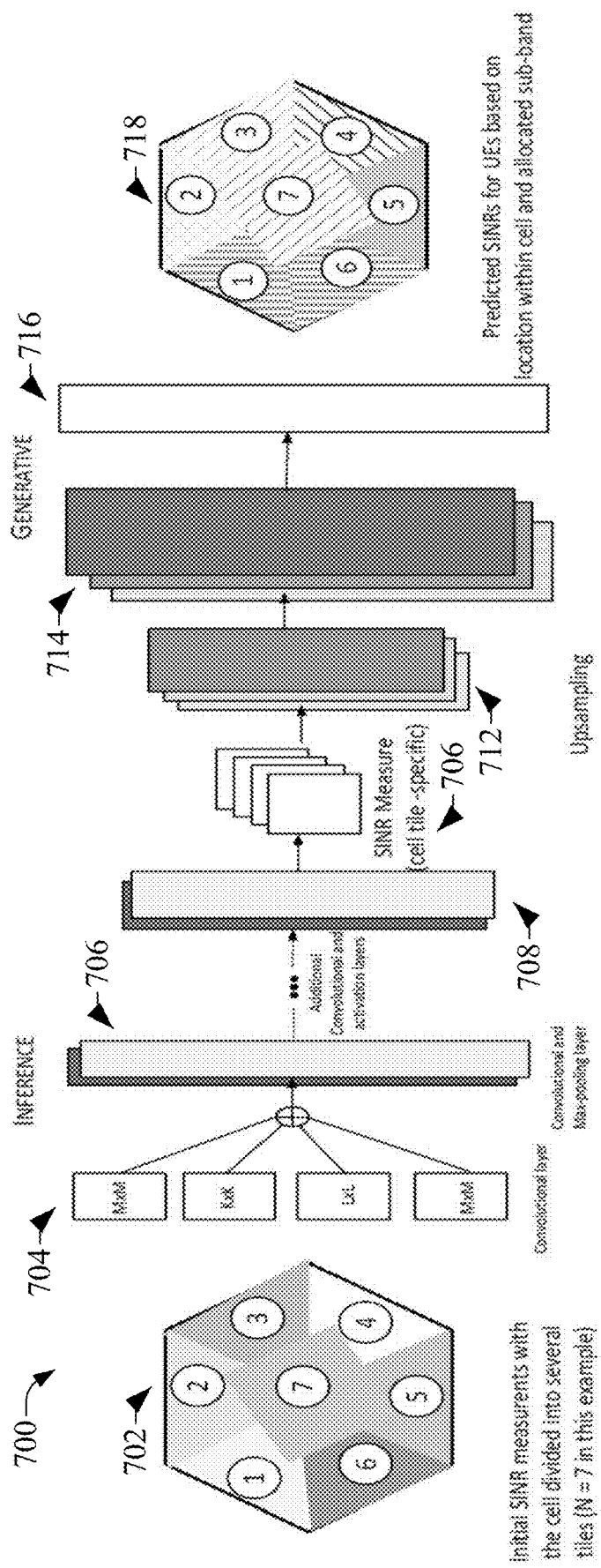
FIG. 7 illustrates end-to-end processing using a variational autoencoder approach to generate signal-to-interference plus noise ratio for a cellular wireless site, in accordance with various non-limiting example embodiments.

FIG. 7 provides an overview of a CNN-LSTM implementation 700 for generative SINR estimation, in accordance with various non-limiting example embodiments disclosed herein. The CNN-LSTM implementation 700 comprises a group of SINR measurement values with the cell 702 divided into several tiles (in this example N=7). The SINR values can be the input to an initial convolutional layer 704. The output of the initial convolutional layer 704 can serve as input to a second convolutional and max pooling layer 706, the output of which can be fed into one or more additional convolutional layer 708. The results (the output) from the additional convolutional layers 708 can be a cell-tile specific SINR measure 710 for each of the several tiles into which the cell 702 was divided. The cell-tile specific SINR measure 710 can then undergo an up-sampling process in an up-sampling layer 712, wherein the resolution or sampling rate of a signal can be increased, making the image appear larger.

Common up-sampling processes can include nearest neighbor interpolation, where each pixel in a newly generated image can be assigned a value of the nearest pixel in the input image; bilinear interpolation, where the value of each pixel can be determined based on a weighted average of the four nearest pixels; bicubic interpolation, this process uses the values of the 16 nearest pixels to determine a new pixel value, resulting in much smoother images; and deep learning processes using, for example, CNNs and other deep learning models that can be trained to up-sample images.

Once up-sampling in up-sampling layer 712 has been performed, a variational encoder layer 714 can be used to encode input data into a latent space and then decode it back to the original space. During training, the model learns to generate data from the latent space. The output of the variational encoder layer 714 can be directed to an output layer 716 that produces final predictions, for example predicted SINRs for UE based on location within the cell and an allocated sub-band 718 that can be used to communicate with the UE.

In regard to the training of the CNN-LSTM model, the training datasets can comprise both collected data and/or generated synthetic data that cover roughly similar radio frequency environments (e.g., tiles). Concerning the variational encoder layer 714 based SINR generation, SINR in each region can be predicted based on measurement values and other latent variable values that the neural network learns the distribution for and uses the generative part of the variational encoder layer 714 to produce them. Further, in some embodiments street maps (if an urban area) can also be incorporated in order to gain further insights.

As mentioned earlier the CQI reports from the UEs can be configured to be obtained at regular intervals. Thus when a generated SINR is available through a more comprehensive data-driven technique as proposed here, a further method can be needed in order to reconcile the CQI recommended by the UE and the second one obtained from using a (generated) SINR to CQI mapping, setting the modulation to the correct value to deliver an error rate that is below a prescribed throughput threshold value given the available SINR.

Let the generated SINR from the two-dimensional variational autoencoder (VAR) module (e.g., a component of adaptation engine 102) be given by $SINR(\lambda^l_k)$. The VAE based generated SINR can provide an estimate of the SINR for different transmission sub-bands of the DL band width (BW). The sub-bands can be pre-determined in order to simplify the scheduling, or they can also be deduced at run-time by using a histogram measure for the obtained SINR such that groups of contiguous sub-carriers exhibiting SINR within $SINR_A$=+/−0.5 dB of each other are grouped together. The value of $SINR_A$ can be selected considering that an SINR change corresponding to the value of $SINR_A$ will not lead to any change in MCS decision for that sub-band by a scheduler.

Furthermore, denoting the most recent CQI Report from user 'u' corresponding to the sub-band 'l' as $CQI^u_{last}$ the following options for the latest received CQI can be incorporated in the decision loop for scheduling. It should be observed that there could possibly be several TTIs between when $CQI^u_{last}$ is received and the current transmission epoch 'k'.

Accordingly, in certain embodiments set forth herein, the final considered CQI used for scheduling at the current subframe k can be a weighted combination of the past CQI and the CQI from the generated SINR with the weighting skewed more towards the generated SINR if a longer duration has passed, e.g. reduced weighting for $CQI^u_{last}$ as follows:

$$CQI_{sk} = \text{Quantize}(\epsilon * CQI^u_{last} + (1-\epsilon) * (\lambda^l_k)) \quad (2)$$

where $\Gamma_u(x)$ is a functional mapping of the SINR to the CQI that applies to the class of UE that user 'u' belongs to. Quantize(x), is a quantization of the CQI value x obtained from equation (2). $\epsilon = 1/2^{k-t}$; k—current TTI, t—TTI when CQI update was last received and sk denotes the current state at time k.

The CQI as obtained above can then be applied to LA modules (e.g., one or more instantiations of adaptation engine 102) that perform rule-based MCS selection on a TTI basis. This approach can be considered a hybrid technique where a machine-based, or more specifically a deep neural network based or variable auto encoder based approach is used to learn the SINR distribution and then a classical model-based approach is applied to LA for fast assimilation of the generated SINR into the MCS decision making process. In some system embodiments a typical CQI to MCS mapping table can be used, for example.

In some described embodiments, the generation of the SINR for a given TTI can be based, for example, on a time history of measured CQI and the prediction/determination module (e.g., adaptation engine 102) does not use any form of geographic or spatial information. For these approaches and LSTM-architecture based forecasting can be used, or if the compute capability is limited then an instantaneous value can be determined using an autoregressive moving average (ARMA) filter applied to the history of states with an LSTM model being applied in a cloud computing model, whereby information from multiple BSs may be also be gathered to develop a higher level model and a correction can be applied as follows to generate the per sub-frame SINR for a given user $u_k$.

In some embodiments the value of E may be set to 0 or 1. When set to 0, the scheduling can be done entirely based on the generated SINR. On the other hand, when set to 1 the generated SINR can be disregarded in favor of using the CQI report only. The latter can be used as a safety measure when the system determines that the ML models used either for generating the SINR are not getting the desired results or in cases where the LA itself is implemented by a machine learning model and the model deviates from optimization of the pre-determined objectives.

Due to the ability of data-driven approaches to better map nonlinear relationships between the input and output of various communication systems, machine learning approaches have become increasingly popular. However, there can be immense challenges in applying these methods to wireless systems since it can be difficult to train an ML module (e.g., an aspect of adaptation engine 102) for every possible variation of the RF environments in which they can operate as both the location of BS (urban/suburban/rural) and number of users (e.g., UE) can vary widely along with traffic demand. In some circumstances this can rule out the ability of supervised ML methods to be effective and methods based on deep reinforcement learning (DRL) where the input/output (I/O) relationships are modeled using deep neural networks (DNNs) can hold more promise if designed well.

The systems and/or methods described herein can apply to any OFDMA systems in general and to the downlink of cellular systems and Wi-Fi systems in particular where a central unit (such as a base station or an access point) is responsible for allocation of spectral resources in a multi-user setting and there is a need for selection of appropriate transmission parameters that are aligned with the prevalent channel conditions. Accordingly, this disclosure provides details concerning the generation SINR information such as to optimize the link adaptation operation in a way such that the impediments to efficient LA can be addressed.

In this regard, we show in FIG. 5, the aspects within the downlink data path that can be affected by the link adaptation module (e.g., adaptation engine 102) and effectively determine the energy consumed in enabling transmissions. In brief, FIG. 5 illustrates aspects of baseband data processing for a generic MIMO-OFDM system with $N_t$ transmit antennas, and with UE (receiver) using $N_r$ antennas. For each of the users, the data can be encoded by a standards-defined FEC and mapped with a symbol mapper to achieve bit-interleaved coded modulation (BICM) vectors of I and Q symbols which can then be multiplied by spatial pre-coding matrices prior to be being converted to a time-domain and processed by the RF front-end (RFFE). Each active RFFE can consume power and hence the number of RF paths that are active need to be determined carefully. The data path of all other users (e.g., UE) scheduled on DL can be the same as shown for user 'k' in FIG. 5 and can be combined at the IFFT step for each of the antenna ports. The link adaptation module (e.g., adaptation engine 102) can provide the modulation and coding rates to be used for each user and they can vary independently.

The MCS determination for each UE can be done based on feedback related to the downlink channel that can be received by BS equipment through either uplink control channel, whereby each of the UEs send data relevant to the link adaptation process in the form of a channel state information (CSI) report. For time domain duplexing (TDD) links on the other hand, the BS equipment can further perform channel estimation to derive link parameters from the uplink channel that can be useful for DL adaptation due to channel reciprocity.

As has been observed above, while estimating the SINR is quite important for proper link adaptation, often times it is challenging to do this using only real-time computation for the entire bandwidth due at least to the following reasons: (a) accurate channel estimates often require matrix inversions or methods that help solve them algebraically are typically processor intensive; (b) SINR estimation for a wide-band with sparse pilots only can lead to inaccuracy in the estimation for most channel except for the ideal case of frequency flat channels; (c) in most cases the closed form or empirical models for SINR distribution work only for a small set of scenarios and the opportunity to derive more accurate SINRs from relevant adjacent information can be missed.

To date, a popular approach to addressing the foregoing has been to use log-normal distribution with parameters adjusted per the deployment environment: $P(u_k)=P_0-10*w_k \log_{10}(|r_k-s_k|^2/d_k)+n_k$. While a more accurate estimate might be possible by using ray-tracing approaches, they can be complex to generate in real-time, and generally are better suited to pre-deployment of offline scenarios.

To alleviate the above issues, a data-driven approach that progressively improves the predicted SINR by using historical SINR and channel estimation data to better define the relationship between SINR and the user-channel environmental map and spatio-temporal changes to it to achieve more granular, cell site-specific modeling can be the implemented. The end-to-end data processing pipeline to generate SINRs, as depicted in FIG. 7, can use both a spatial collection of SINR data sets as well as a historical database.

As observed above, VAE typically comprise of two sections, an encoder section and a decoder section whereby the encoder section can learn the distribution in the low-dimensional latent space over input data samples. The decoder section, on the other hand, can be a generative model that can learn the joint distribution of the latent variables and input data.

In accordance with various example embodiments a CNN-LSTM concatenated model for the SINR prediction can be used, whereby the CNN model is used to acquire the signal measurements from different parts of the cell based on a distribution of UEs and the measured signal power for different UE located in different geographic locations within the geographic extent of cell boundary, and the LSTM network keeps track of the time-based correlation of the measured SINR. LSTM are a type of recurrent neural network (RNN) that are able to model sequential data well when the memory in the distribution is more than just one time epoch. Due to the symbol rates (wider bandwidth) considered for 5G and beyond the temporal correlation in channel data tends to be several OFDM symbols and therefore the addition of a LSTM network models this behavior well.

Figure 8:
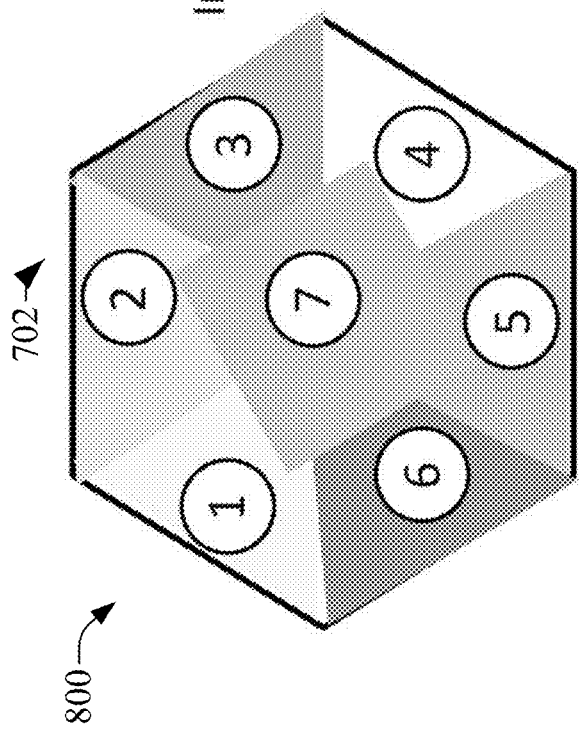
FIG. 8 illustrates data collection and sampling from tessellated regions within the cellular wireless site, in accordance with various non-limiting example embodiments.

As depicted in FIG. 8, for purposes of data collection and pre-processing, the entire cell 800 (e.g., 702 in FIG. 7) can be divided into regions (tiles) that exhibit similar spatial characteristics and observed UE density. The data-driven approach disclosed herein makes use of both spatially correlated and historical data of SINR estimation/CQI to establish a relationship between SINR and the radio frequency (RF) environment and its evolution over both time and spatial dimensions. Leverage can be made of the ability of advanced machine learning (ML) architectures, namely VAE and employ the VAE as a compute/processing engine for deriving such relationships. The challenge however for data-driven SINR prediction is that the number of training features available when basing the SINR prediction solely on field measurements is that they can be sparse. A further challenge with respect to available UE measurements based data is that such data generally does not fully reflect channel variations. Generating auxiliary features to assist the training process of the neural network model and improve model performance can be challenging.

The data collection for the training stages can be done as a combination of a simulative exercise whereby street maps (such as open street map\e (OSM)—a collaborative project to create a free, editable maps of the world) can be used in combination with ray tracing to determine the signal level at given geographical location (e.g., defined by geo-spatial coordinate representations determined based on a geographic coordinate system (GCS)—a spherical or geodetic coordinate system for measuring and communicating positions directly on Earth as latitude and longitude, or global navigation satellite system (GNSS) coordinates) and the UE density serving as a proxy for the level of interference experienced by each UE or obtained from historically collected data in a non-green field deployment (e.g., within an urbanized core and its general vicinity).

The training can be performed using both collected or synthetic data sets that can cover roughly similar RF environments (tiles)—breaking down the cell into a tiled grid (7 tiles as shown in the figure is exemplary and can be more granular) where an SINR sample corresponding to each tile is collected over a period of time and used for training purposes.

Concerning the operation of the VAE based SINR Generation, SINR for each region can be predicted based on measurements and other latent variables that the NN learns the distribution for and uses the generative part of the VAE to produce them. In some embodiments a street map (if an urban area) can also be incorporated to gain more insights. The general idea of autoencoders is relatively straightforward and it consists in setting an encoder and a decoder as neural networks to learn the best encoding-decoding scheme using an iterative optimization process. So at each iteration, the VAR end-to-end pipeline can be fed with some data and after processing the encoded-decoded output with the input data the error is back propagated through the architecture to update the weights of the networks.

Figure 9:
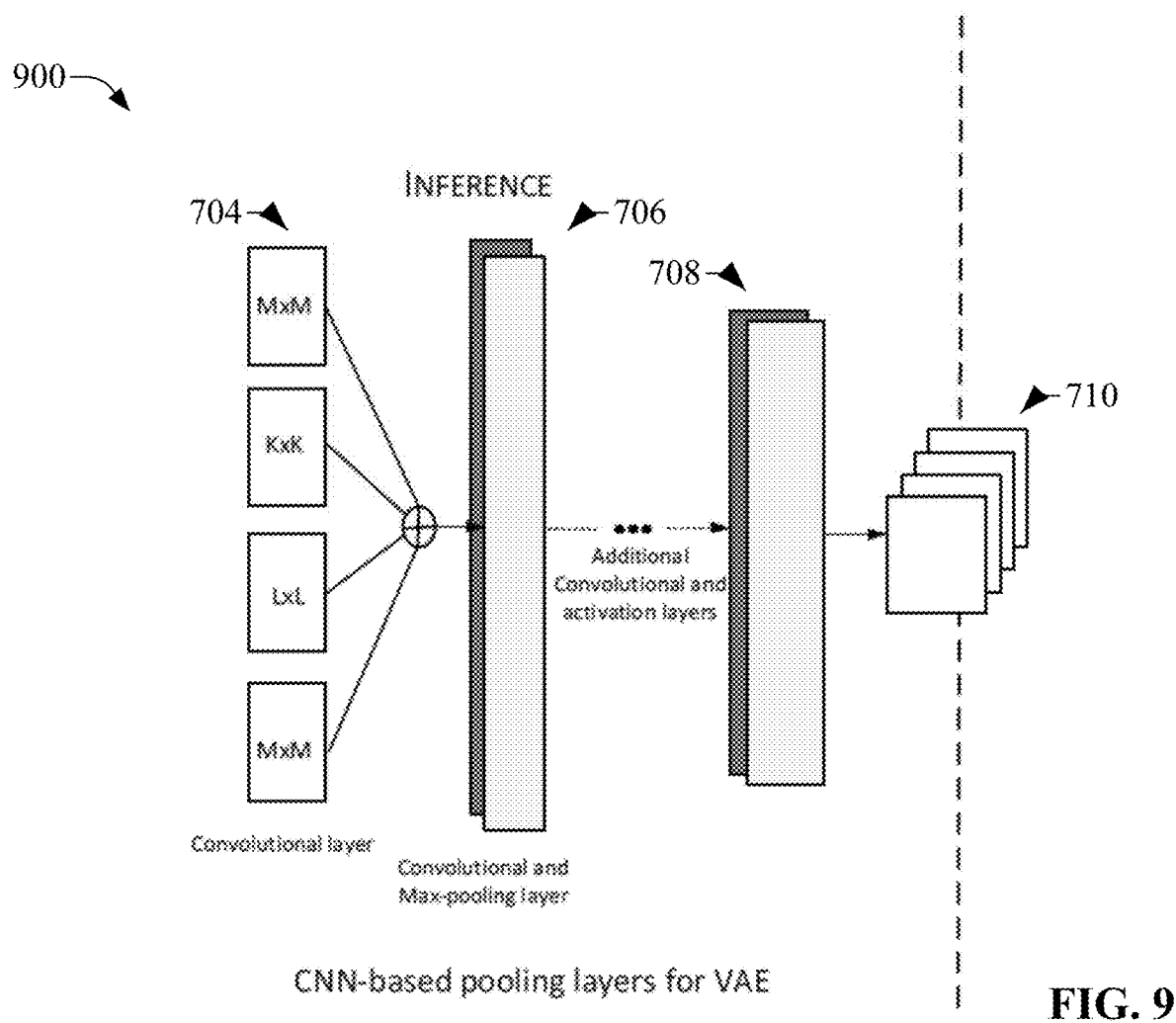
FIG. 9 illustrates an encoder (inference) stage of the variational autoencoder using multi-stage convolutional neural network and long short term memory cascade, in accordance with various non-limiting example embodiments.

Concerning the inference/encoder, the encoder portion of the VAE (also referred to as the inference model), learns the posterior on the low-dimensional latent space over the input data samples. As shown in FIG. 9 and FIG. 7, the inference stage, can comprise multiple convolutional layers 704, followed by max-pooling layers 706 where the input is the spatially correlated SNR for different tiled regions of the cell. Note that the last layer 708 can comprise an LSTM stage where historical values from the information compressed through previous layers can be fed in order to account for the temporal correlation aspect.

The successive inference stages are essentially doing dimensional reduction to focus on the most important characteristics of the distribution for a decoder to learn and reproduce.

Figure 10:
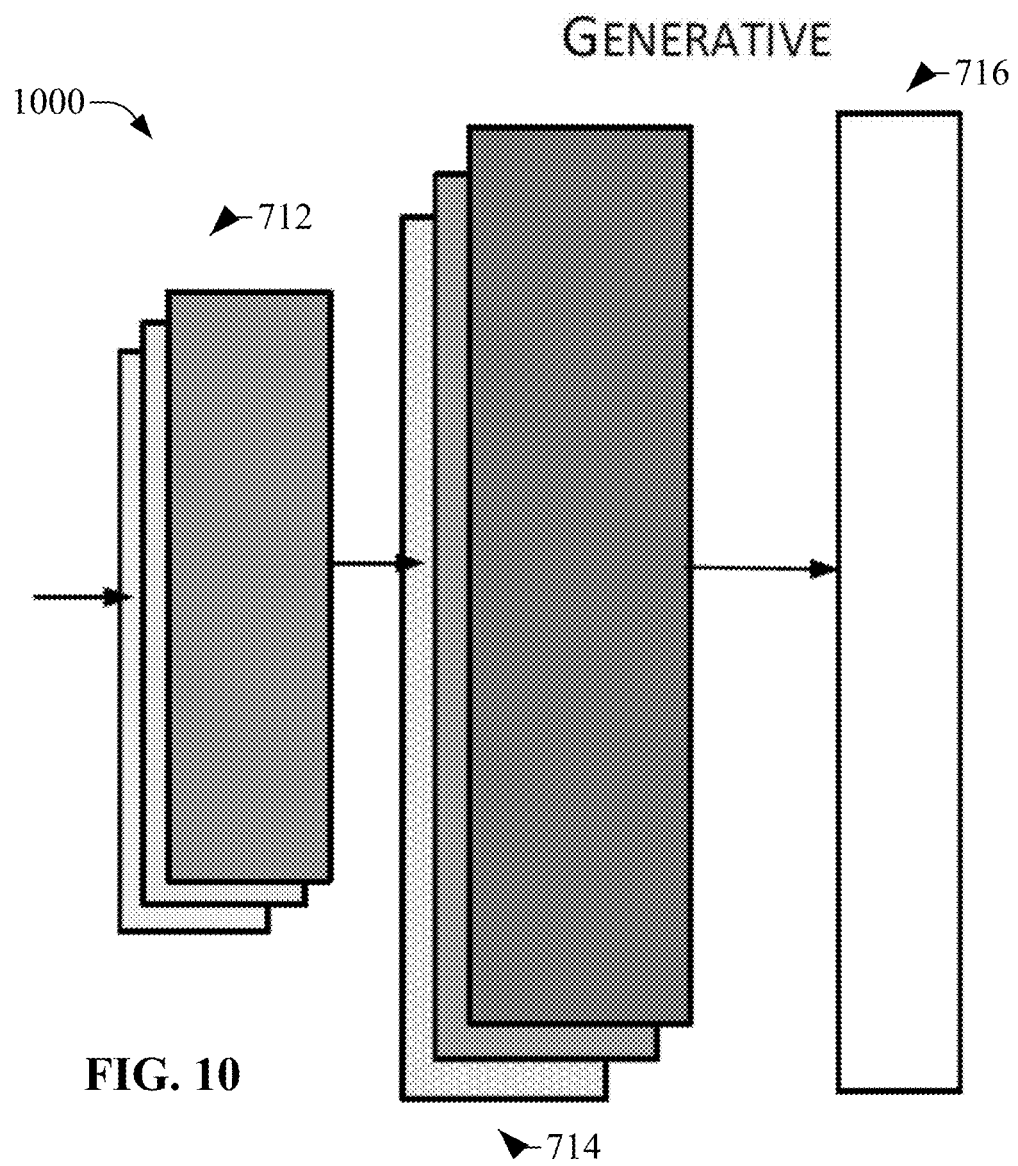
FIG. 10 illustrates a decoder (generative) stage of the variational autoencoder that approximates a 2-D signal-to-interference plus noise distribution, in accordance with various non-limiting example embodiments.

With regard to generation/decode, the decoder stage 1000 of FIG. 10 (also items 712, 714, and 716 of FIG. 7) of the VAE can be a generative model that learns the joint distribution of the latent variables and input data. As shown in FIG. 10, the first few layers of the decoder aspect can be set as convolutional layers as the signals can be distributed in 2D-plane (spatial dimension only—no azimuth as that is available from the ray tracing on the relief map or actual historical measurements already). Typically, the decoder/generator architecture is the inverse of the encoder/Inference part. A lost function for the VAE can be incorporated as follows (with the first term being the expected data log-likelihood):

$$L_{VAE} = -\Sigma E_z(z|x_i) \log p_\theta(x_i|z) + ((z|x_i) \| p_\theta(z))$$

The first term in the above equation denotes the expected log-likelihood of the data and the second term is the Kullback-Leibler (KL) divergence between the posterior distribution at inference stage so and at the generative stage, po. The lost function works as a regularization parameter over the latent space. Since a comparison is made between two distributions in arriving at the generative models, a measure of similarity between both distributions is needed which is done here using DKL. It is essentially the expectation of the information difference between both distributions. Note that in order to be able to use the decoder of the VAE for generative purposes, the latent space should be regular enough and therefore to obtain such regularity, it is introduced explicitly during the training process.

Figure 11:
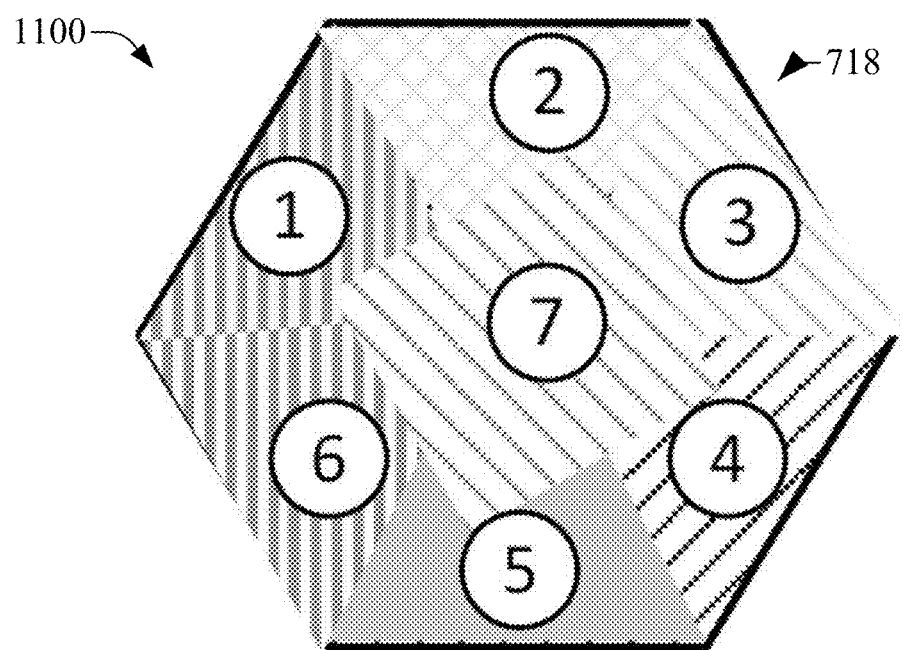
FIG. 11 depicts a predicted mean signal-to-interference plus noise ratio for various regions of a cellular wireless site, in accordance with various non-limiting example embodiments.

The final stage of the SINR generation is where a mean value (and in some cases also a variance) for SINR can be generated for the different regions identified within the cell as shown as 1100 in FIGS. 11 and 718 in FIG. 7.

Concerning areas with low UE densities, while DL LA can be a function carried out at BS equipment, UEs can provide two critical pieces of information for DL LA: (1) the CQI report for the sub-band that it receives information on in the DL—the frequency of reporting can be set by BS equipment; and (2) HARQ feedback in the form of 1-bit ACK/NACK for each code block of data that is transmitted to it.

As has been observed earlier, CQI reporting is only scheduled periodically in practical systems and therefore based on the frequency of obtaining CQI reports there can be a mismatch between outdated CQI values and the actual current DL channel state, resulting in inaccurate MCS decisions using traditional LA techniques. These LA techniques, usually ignore the CQI feedback delay or rely on frequent CQI reporting. Both of these can cause reductions in throughput and transmission efficiency.

In order to counter the foregoing deficiency, a DRL agent for LA can be implemented at BS equipment and in addition to CQI reports, the DRL agent is able to take into account the fact that CQI reporting is delayed and periodic.

When the channel is changing more rapidly than the reporting frequency, the DRL agent can use prediction modules (e.g., associated with adaptation engine 102) that can take into account the time between CQI reports and the actual difference between the reported CQI (e.g., without resorting to greater CQI reporting frequency for higher accuracy).

In some embodiments, prioritized experience replay (PER) for learning can be used for downlink adaptation. In tradition RL, experience replay (ER) replays transitions at the same frequency as they were originally experienced at, regardless of their significance of action (measured by reward value for the described DRL based implementation).

For LA, a reward needs to be weighed properly as an action that leads to a BLER target being met (ACK received), for example, although a positive, can also be due to use of a conservative MCS values, which keeps throughput low (a negative outcome). RL approaches typically have a trade-off between exploration, which determines the impact of various actions given a state, versus exploitation (e.g., use of an optimal action for that instant). Accordingly, in some embodiments a framework for prioritizing experience as it relates to LA can be used, so as to replay important network events and their impact gauged more frequently, and therefore learn more efficiently.

The disclosed framework in accordance with various embodiments can use two buffers that can record events with positive and negative rewards separately. Even within each of the buffers—positive and negative buffers, separate lists can be maintained with increasingly positive (negative) rewards depending on how well an optimization objective is fulfilled and/or the number of objectives met in a multi-objective LA module (e.g., adaptation engine 102), for example, throughput, latency, BLER, energy efficiency, etc. being satisfied simultaneously receives the highest reward. Moreover, since training data sets are usually finite, the number of times a certain experience is used for weight update of a Deep Q-Network (DQN)—a type of deep reinforcement learning method—can also be varied to reduce bias.

FIG. 1 depicts a system 100 for generative signal to interference plus noise ratio (SINR) estimation, in accordance with various non-limiting example embodiments. System 100, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing equipment, machines, and/or database equipment, laptop computers, notebook computers, desktop computers, cell phones, smart phones, consumer appliances and/or instrumentation, industrial devices and/or components, hand-held devices, personal digital assistants, multimedia Internet enabled phones, Internet of Things (IoT) equipment, multimedia players, and the like.

System 100 can comprise adaptation engine 102 that can be in operative communication with processor 104, memory 106, and storage 108. Adaptation engine 102 can be in communication with processor 104 for facilitating operation of computer-executable instructions or machine-executable instructions and/or components by adaptation engine 102; memory 106 for storing data and/or computer-executable instructions and/or machine-executable instructions and/or components; and storage 108 for providing longer term storage of data and/or machine-readable instructions and/or computer-readable instructions. Additionally, system 100 can also receive input 110 for use, manipulation, and/or transformation by adaptation engine 102 to produce one or more useful, concrete, and tangible results, and/or transform one or more articles to different states or things. Further, system 100 can also generate and output the useful, concrete, and tangible result and/or the transformed one or more articles as output 112.

Figure 2:
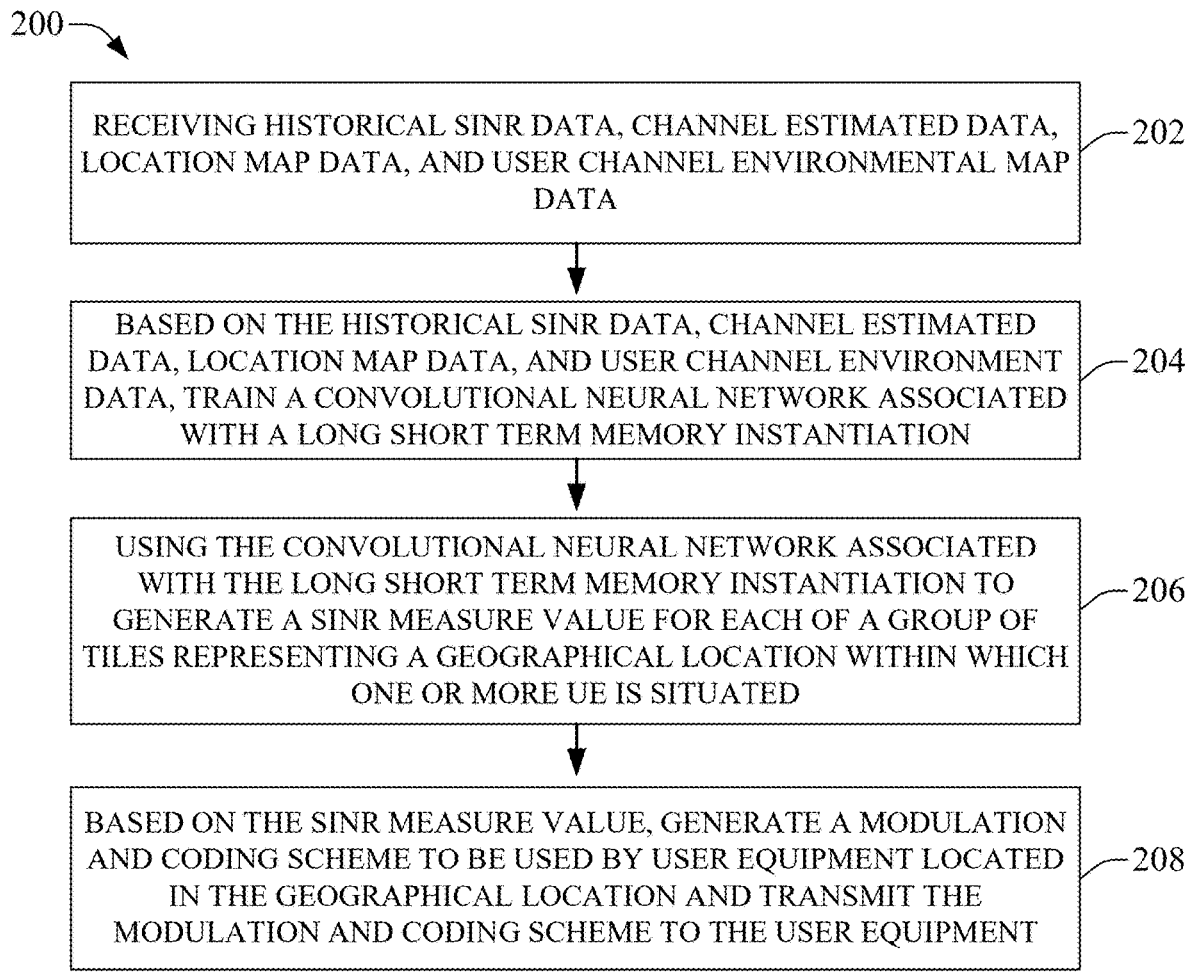
FIG. 2 depicts a method, flow chart, or time sequence, for generative SINR estimation, in accordance with various non-limiting example embodiments.

FIG. 2 illustrates a method 200 for generative SINR estimation, wherein in some embodiments adaptation engine 102 can execute the acts detailed therein. Method 200 can commence at act 202 where adaptation engine 102 can receive historical signal-to-interference plus noise data representing an image of a cellular network infrastructure comprising sectors of a cellular structure associated with a cellular wireless network, channel estimation data representative of at least one performance metric of at least one communication channel established between BS equipment and at least one UE connected via the cellular wireless network, location map data representative of at least one location of the at least one UE, and user channel environmental map data representative of a spatio-temporal variation associated with one or more of a mobility of the at least one UE, a signal quality associated with the at least one UE, network load data associated with the cellular wireless network, and ambient environmental conditions being experienced by the at least one UE, wherein the image of the cellular wireless network infrastructure is tessellated into a group of tiles based on location map data, and wherein a first tile of the group of tiles overlaps a second tile of the group of tiles.

At act 204, based on the historical signal-to-interference plus noise data, the channel estimation data, the location map data, and the user channel environmental map data, a signal quality associated with the at least one UE, network load data associated with the cellular wireless network, and ambient environmental conditions being experienced by the at least one UE, and the group of tiles, a convolutional neural network model can be trained using a convolutional neural network associated with a long short term memory instantiation.

At act 206, adaptation engine 102, using the convolutional neural network model associated with the long short term memory instantiation, can generate a signal-to-interference plus noise ratio measurement value for each of the group of tiles based on respective distributions of respective collections of disparate UE situated within the respective sectors of the cellular wireless network infrastructure and respective measured signal powers associated with the respective collections of disparate user equipment, wherein the respective collections of the disparate user equipment are located in the respective sectors of the cellular wireless network infrastructure as tessellated into the group of tiles. Also, at act 206, adaptation engine 102 can employ an up-sampling process to increase spatial dimensions of the cellular wireless network infrastructure as tessellated into the group of tiles.

At act 208, adaptation engine 102, based on the signal-to-interference plus noise ratio measurement value, can generate a modulation and coding scheme that can be used by UE located in the geographical location and transmit the modulation and coding scheme to the UE.

Figure 3:
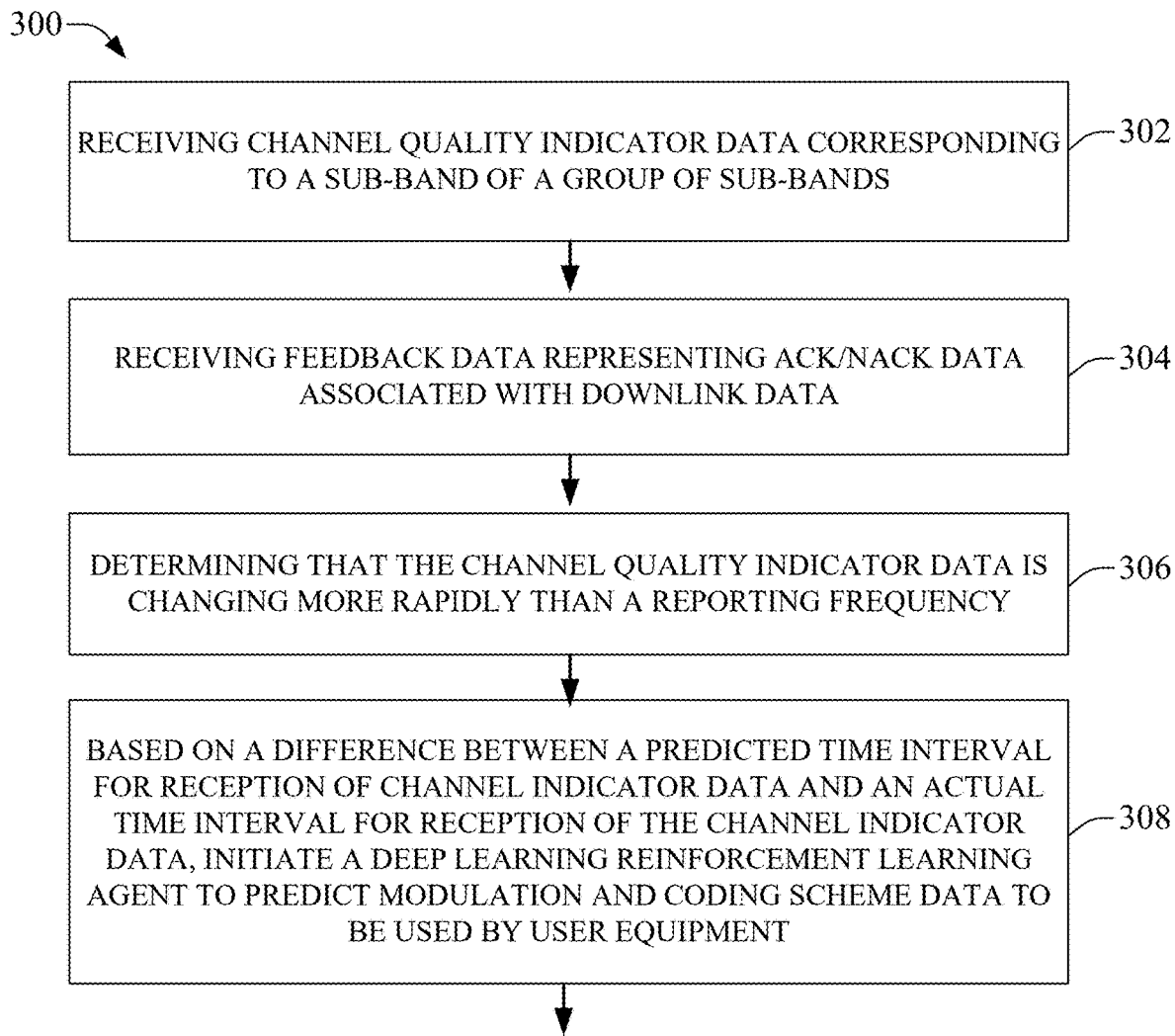
FIG. 3 illustrates another method, flow chart, or time sequence, for generative SINR estimation, in accordance with various non-limiting example embodiments.

FIG. 3 illustrates another method 300 for generative SINR estimation, wherein in embodiments adaptation engine 102 can execute the acts detailed therein. At act 302, adaptation engine 102 can receive, from UE, channel quality indicator data representative of a channel quality for a sub-band of a channel in a defined frequency spectrum, wherein the sub-band is the sub-band on which the UE receives downlink data. At act 304, adaptation engine 102 can receive, from the UE, feedback data representing acknowledgment and negative acknowledgment data associated with the downlink data transmitted to the UE. At act 306, adaptation engine 102 can determine that the channel quality indicator data is changing more frequently/rapidly than a reporting frequency specified by BS equipment for use by the UE. At act 308, adaptation engine 102, based on determining a difference between a predicted time interval for reception of channel indicator data and an actual time interval for reception of the channel indicator data, initiating a deep learning reinforcement learning agent to predict modulation and coding scheme data to be transmitted and used by the UE.

Figure 4:
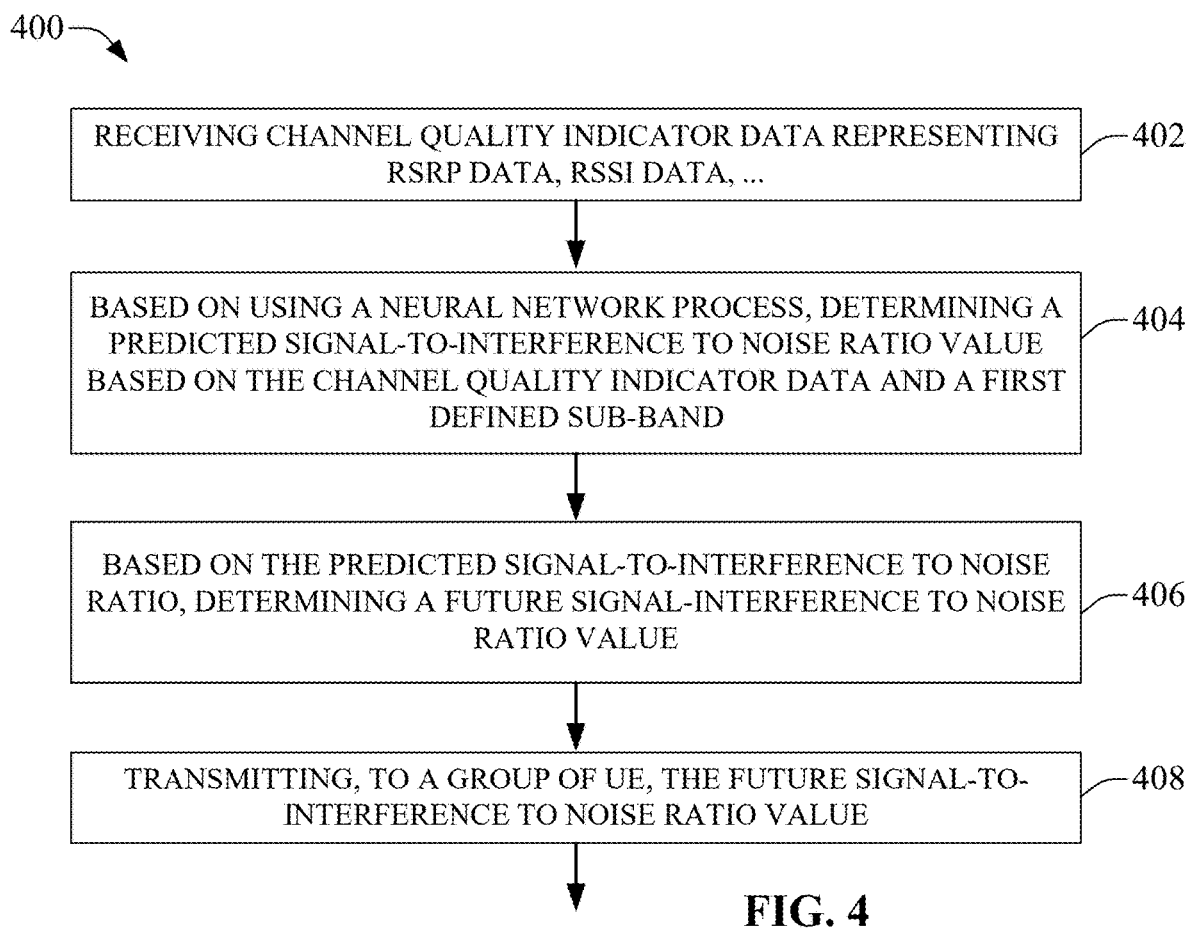
FIG. 4 illustrates a further method, flow chart, or time sequence, for generative SINR estimation, in accordance with various non-limiting example embodiments.

FIG. 4 illustrates a further method 400 for generative SINR estimation, wherein in the disclosed embodiments, at act 402, adaptation engine 102 can receive channel quality indicator data representing received signal strength indicator (RSSI) data, reference signal received power (RSRP) data, and the like, wherein the channel quality indicator data is representative of a channel quality corresponding to a first defined sub-band of the group of sub-bands that is to be used in scheduling a subsequent transmission of data. At act 404, adaptation engine 102, can determine, using a neural network process, a predicted signal-to-interference plus noise ratio value based on the channel quality indicator data and a first defined sub-band.

At act 406, adaptation engine 102, based on the predicted signal-to-interference plus noise ratio value corresponding to the first defined sub-band, can determine a future signal-to-interference plus noise value to be applicable to a second defined sub-band of the group of sub-bands. At act 408, adaptation engine 102 can transmit, to a group of user equipment, the future signal-to-interference plus noise value, to be used by the group of user equipment.

RSSI data is a measure of the power level that a received radio signal has at a receiver (e.g., UE), it represents the quality and strength of the received signal. RSRP data measures the average power of a reference signal received from a single cell or sector and is used, for instance, for cell selection, handover, and coverage optimization.

In connection with channel quality indicator (CQI) data, this data can comprise a CQI value—a numerical representation of the channel quality, it typically ranges from 0 to about 15, where higher values indicate better channel quality, which can be used by BS equipment to determine the most suitable modulation scheme and coding rate for data transmission. Also, CQI data can include measurement report data measurements taken by the UE of the received signal strength and quality. These measurements can include parameters like RSRP and Reference Signal Received Quality (RSRQ). Further, CQI data can also include wideband and sub-band CQI, where the CQI can be reported as a single wideband value that reflects the overall channel quality across the entire bandwidth. Alternatively, sub-band CQI values can be reported, which provide more granular information about the channel quality in different frequency sub-bands. This allows for more precise resource allocation Further, CQI data can further include timing information about when the measurements were taken. This timing information can be important for aligning the CQI report with the current channel conditions.

It will be appreciated by those skilled in the art that the preceding examples and embodiments are exemplary and not limiting to the scope of the present disclosure. It shall also be noted that elements of any claims may be arranged differently including having multiple dependencies, configurations, and combinations.

Figure 12:
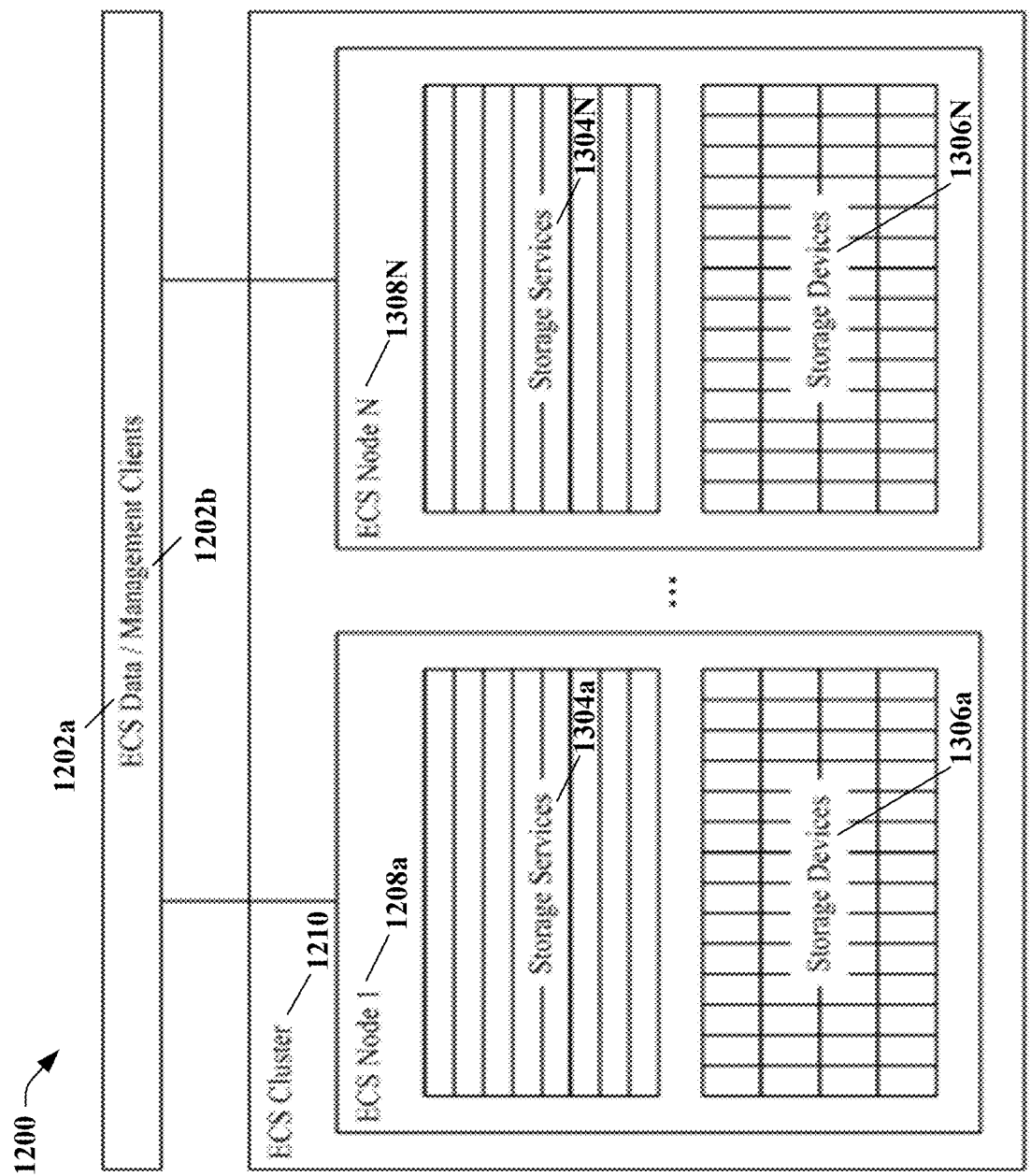
FIG. 12 illustrates a cloud storage systems, such as an elastic cloud storage (ECS) system, in accordance with various non-limiting example embodiments.

In the following, FIG. 12 describes an example non-limiting cloud storage system in the non-limiting context of an ECS storage system, but for the avoidance of doubt, the subject embodiments can apply to any storage platform. For instance, in this regard, FIG. 12 illustrates an ECS storage system 1200 comprising a cloud-based object storage appliance in which corresponding storage control software comprising, e.g., ECS data client(s) 1202*a*, ECS management client(s) 1202*b*, storage service(s) 1204*a* . . . 1204N, etc. and storage devices 1206*a* . . . 1206N (e.g., storage media, such as physical magnetic disk media, etc. of respective ECS nodes of ECS cluster 1210) are combined as an integrated system with no access to the storage media other than through the ECS storage system 1200.

In this regard, ECS cluster 1210 comprises multiple nodes 1208*a* . . . 1208N, storage nodes, ECS nodes, etc. Each node is associated with storage devices 1206*a* . . . 1206N, e.g., hard drives, physical disk drives, storage media, etc. In embodiment(s), ECS node 1208*a*, or any ECS node, executing on a hardware appliance can be communicatively coupled, connected, cabled to, etc., e.g., 15 to 120 storage devices. Further, each ECS node can execute one or more services for performing data storage operations described herein.

For instance, the ECS storage system 1200 can be an append-only virtual storage platform that protects content from being erased or overwritten for a specified retention period. In particular, the ECS storage system 1200 does not employ traditional data protection schemes like mirroring or parity protection. Instead, the ECS storage system 1200 utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS storage system 1200 can support storage, manipulation, and/or analysis of unstructured data on a massive scale on commodity hardware. As an example, the ECS storage system 1200 can support mobile, cloud, big data, and/or social networking applications. In another example, the ECS storage system 1200 can be deployed as a turnkey storage appliance, or as a software product that can be installed on a set of qualified commodity servers and disks, e.g., within a node, data storage node, etc. of a cluster, data storage cluster, etc. In this regard, the ECS storage system 1200 can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to determine probabilistic likelihoods that code paths utilize operating system synchronization mechanism, as described herein.

A classifier can be a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1322, disk storage 1324, and/or memory storage 1346, further description of which is below. For instance, nonvolatile memory can be included in read only memory (ROM), programmable ROM (PROM), electrically programmable ROM (EPROM), electrically erasable ROM (EEPROM), or flash memory. Volatile memory 1320 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 13:
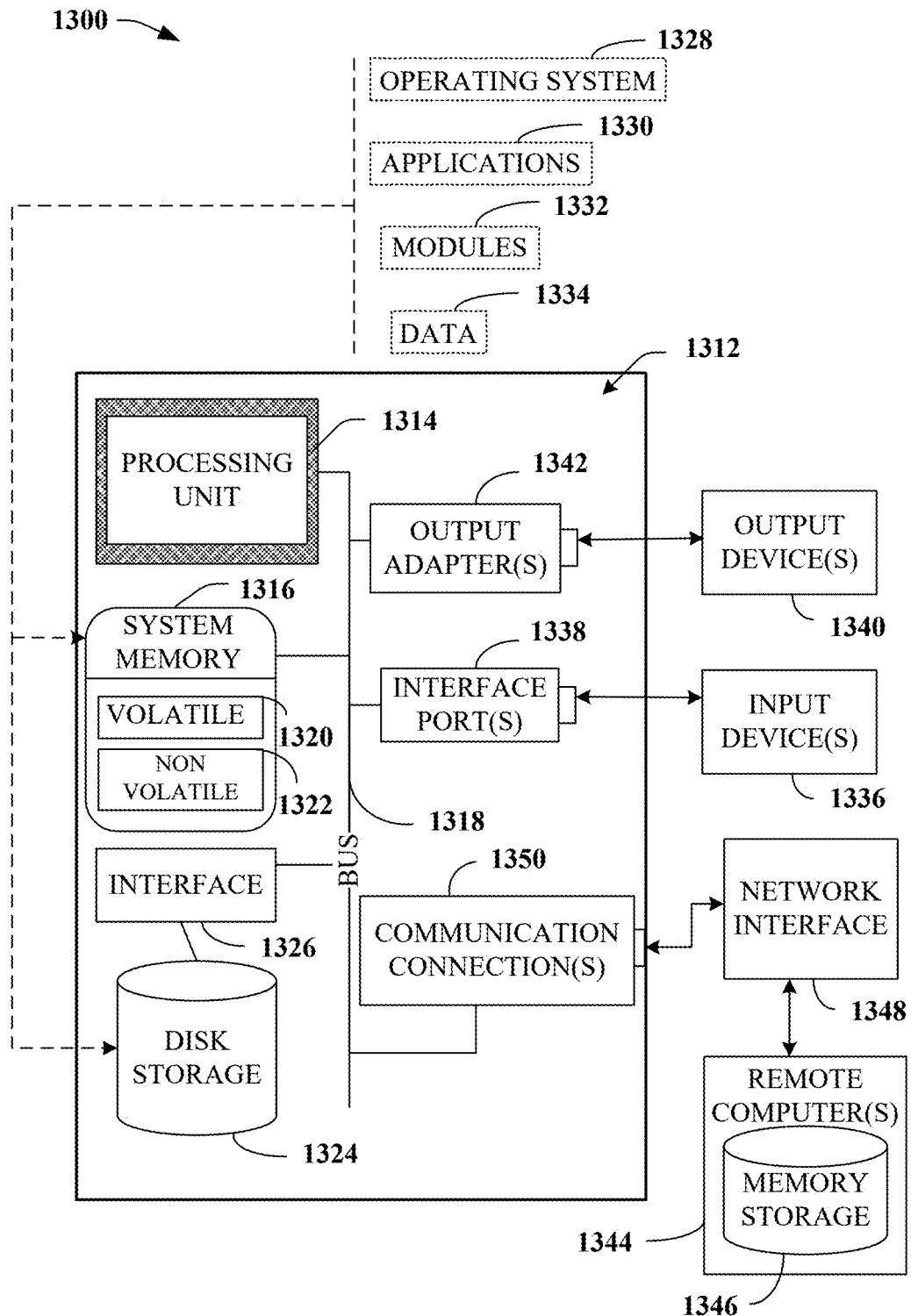
FIG. 13 illustrates a block diagram representing an illustrative non-limiting computing system or operating environment in which one or more aspects of various non-limiting embodiments described herein can be implemented.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

FIG. 13, a block diagram of a computing system 1300, e.g., system 100, operable to execute the disclosed example embodiments, is illustrated, in accordance with an embodiment. Computer 1312 comprises a processing unit 1314, a system memory 1316, and a system bus 1318. System bus 1318 couples system components comprising, but not limited to, system memory 1316 to processing unit 1314.

Processing unit 1314 can be any of various available processors. Dual microprocessors and other multiprocessor architectures also can be employed as processing unit 1314.

System bus 1318 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1316 comprises volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can comprise ROM, PROM, EPROM, EEPROM, or flash memory. Volatile memory 1320 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 also comprises removable/non-removable, volatile/non-volatile computer storage media. FIG. 13 illustrates, for example, disk storage 1324. Disk storage 1324 comprises, but is not limited to, devices like a magnetic disk drive, floppy disk drive, tape drive, Jaz drive, Zip drive, LS-100 drive, flash memory card, or memory stick. In addition, disk storage 1324 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

It is to be appreciated that FIG. 13 describes software that acts as an intermediary between users and computer resources described in suitable operating environment 1300. Such software comprises an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be appreciated that the disclosed subject matter can be implemented with various operating systems or combinations of operating systems.

A user can enter commands or information into computer 1312 through input device(s) 1336. Input devices 1336 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1314 through system bus 1318 via interface port(s) 1338. Interface port(s) 1338 comprise, for example, a serial port, a parallel port, a game port, a universal serial bus (USB), a wireless based port, e.g., Wi-Fi, Bluetooth, etc. Output device(s) 1340 use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340, like display devices, light projection devices, monitors, speakers, and printers, among other output devices 1340, which use special adapters. Output adapters 1342 comprise, by way of illustration and not limitation, video and sound devices, cards, etc. that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, a workstation, a microprocessor based appliance, a peer device, or other common network node and the like, and typically comprises many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically and/or wirelessly connected via communication connection 1350. Network interface 1348 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can comprise, for example, internal and external technologies such as modems, comprising regular telephone grade modems, cable modems and DSL modems, wireless modems, ISDN adapters, and Ethernet cards.

The computer 1312 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1312 can connect to other devices/networks by way of antenna, port, network interface adaptor, wireless access point, modem, and/or the like.

The computer 1312 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at a 10 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

What is claimed is:

1. Base station equipment, comprising:
at least one processor; and
at least one memory that stores executable instructions that, when executed by the at least one processor, facilitate performance of operations, comprising:
receiving historical signal-to-interference plus noise ratio data representing a cellular network infrastructure comprising sectors of a cellular network, channel estimation data representative of at least one performance of at least one communication channel established between the base station equipment and at least one user equipment connected via the cellular network, location map data representative of at least one location of the at least one user equipment, and user channel environmental map data representative of a spatio-temporal variation associated with one or more of at least one mobility of the at least one user equipment, at least one signal quality associated with the at least one user equipment, a network load associated with the cellular network, and at least one ambient environmental condition being experienced by the at least one user equipment, wherein the cellular network infrastructure is tessellated into a group of tiles based on the location map data, and wherein a first tile of the group of tiles overlaps a second tile of the group of tiles;
using a convolutional neural network comprising a first layer representing at least one first convolutional layer, a second layer representing at least one second convolutional layer and a max-pooling layer, and a third layer representing at least one third convolutional layer and at least one activation layer;
based on a result of using the convolutional neural network, generating respective signal-to-interference plus noise ratio measures for respective tiles of the group of tiles based on respective distributions of respective collections of different user equipment situated within respective sectors of the cellular network infrastructure and respective measured signal powers associated with the respective collections of different user equipment, wherein the respective collections of the different user equipment are located in the respective sectors of the cellular network infrastructure as tessellated into the group of tiles;
using an up-sampling process to increase spatial dimensions of the cellular network infrastructure as tessellated into the group of tiles; and
based on respective locations of the different user equipment, generating respective predicted signal-to-interference plus noise ratios for the different user equipment.

2. The base station equipment of claim 1, wherein the channel estimation data comprises a channel quality indicator value indicative of a numeral representation of a channel quality associated with the at least one communication channel established between the base station equipment and the at least one user equipment.

3. The base station equipment of claim 1, wherein the operations further comprise receiving rank indicator data indicative of a number of independent data streams capable of being concurrently transmitted using a single frequency resource associated with the at least one communication channel established between the base station equipment and the at least one user equipment.

4. The base station equipment of claim 1, wherein the operations further comprise receiving, from the at least one user equipment, pre-coding matrix indicator data representative of at least one pre-coding matrix identified in at least one defined cookbook of pre-coding matrices that the base station equipment uses to communicate with the at least one user equipment.

5. The base station equipment of claim 1, wherein the operations further comprise receiving, from network equipment associated with the base station equipment, a group of time varying parameter values that remain constant for a defined number of transmission time intervals.

6. The base station equipment of claim 5, wherein, after completion of the defined number of transmission time intervals, the group of time varying parameter values are changed.

7. The base station equipment of claim 1, wherein the operations comprise receiving, from network equipment, network prediction data indicative of network traffic patterns that have been determined based on historical network traffic patterns, current network traffic conditions, and an output from a machine learning model trained to generate the network prediction data.

8. The base station equipment of claim 1, wherein the operations comprise receiving, from network equipment, traffic shaping data representative of information associated with a current flow of data packets, and wherein the current flow of data packets is set to result in a threshold efficient utilization of cellular network resources according to a defined efficiency criterion.

9. The base station equipment of claim 1, wherein the operations comprise receiving, from the respective collections of different user equipment, a grouping of channel state information report data.

10. The base station equipment of claim 1, wherein the operations comprise receiving, from the respective collections of different user equipment, radio frequency traffic demand data, and wherein the radio frequency traffic demand data comprises a numerical value representative of a number of the different user equipment within the respective collections of different user equipment that are executing network intensive application instances.

11. A method, comprising:
receiving, by base station equipment comprising at least one processor, historical signal-to-interference plus noise ratio data representing a cellular network infrastructure comprising sectors of a cellular network, channel estimation data representative of at least one performance of at least one communication channel established between the base station equipment and at least one user equipment connected via the cellular network, location map data representative of at least one location of the at least one user equipment, and user channel environmental map data representative of a spatio-temporal variation associated with one or more of at least one mobility of the at least one user equipment, at least one signal quality associated with the at least one user equipment, network load associated with the cellular network, and at least one ambient environmental condition being experienced by the at least one user equipment, wherein the cellular network infrastructure is tessellated into a group of tiles based on the location map data, and wherein a first tile of the group of tiles overlaps a second tile of the group of tiles;
using, by the base station equipment, a convolutional neural network comprising a first layer representing a first convolutional layer, a second layer representing a second convolutional layer and a max-pooling layer, and a third layer comprising a third convolutional layer and an activation layer;
based on a result of using the convolutional neural network, generating, by the base station equipment, respective signal-to-interference plus noise ratio measures for respective tiles of the group of tiles based on respective distributions of respective collections of disparate user equipment situated within respective sectors of the cellular network infrastructure and respective measured signal powers associated with the respective collections of disparate user equipment, wherein the respective collections of the disparate user equipment are located in the respective sectors of the cellular network infrastructure as tessellated into the group of tiles; and
based on respective locations of the disparate user equipment of the respective collections, generating, by the base station equipment, respective predicted signal-to-interference plus noise ratios for the disparate user equipment.

12. The method of claim 11, wherein the channel estimation data comprises a channel quality indicator value indicative of a numeral representation of a channel quality associated with the at least one communication channel established between the base station equipment and the at least one user equipment.

13. The method of claim 11, further comprising receiving, by the base station equipment, rank indicator data indicative of a number of independent data streams capable of being simultaneously transmitted over a single frequency resource associated with the at least one communication channel established between the base station equipment and the at least one user equipment.

14. The method of claim 11, further comprising receiving, by the base station equipment from the at least one user equipment, pre-coding matrix indicator data representative of at least one pre-coding matrix identified in at least one defined cookbook of pre-coding matrices that the base station equipment uses to communicate with the at least one user equipment.

15. The method of claim 11, further comprising receiving, by the base station equipment from network equipment associated with the base station equipment, a group of time varying parameter values that are maintained for a defined number of transmission time intervals.

16. The method of claim 15, wherein, after completion of the defined number of transmission time intervals, the group of time varying parameter values are permitted to change, based on the respective predicted signal-to-interference plus noise ratios.

17. The method of claim 11, further comprising receiving, by the base station equipment from network equipment other than the base station equipment, network prediction data indicative of network traffic patterns that have been determined based on historical network traffic patterns, current network traffic conditions, and an output from a machine learning model trained to generate information usable to determine the network prediction data.

18. The method of claim 11, further comprising receiving, by the base station equipment from network equipment, traffic shaping data comprising information associated with a current flow of data packets, wherein the current flow of data packets is determined according to a function that results in at least a target efficiency of utilization of cellular network resources according to an efficiency metric.

19. A non-transitory machine-readable medium, comprising executable instructions that, when executed by at least one processor, facilitate performance of operations, comprising:
receiving historical signal-to-interference plus noise ratio data representing a cellular network infrastructure comprising sectors of a cellular network, channel estimation data representative of at least one performance of at least one communication channel established between the base station equipment and different user equipment connected via the cellular network, location map data representative of locations of the different user equipment, and user channel environmental map data representative of spatio-temporal variations associated with one or more of mobilities of the different user equipment, signal qualities associated with the different user equipment, a network load associated with the cellular network, and ambient environmental conditions being experienced by the different user equipment, wherein the cellular network infrastructure is tessellated into a group of tiles based on the location map data, and wherein a first tile of the group of tiles overlaps a second tile of the group of tiles;
obtaining an output from a convolutional neural network comprising a first layer representing at least one first convolutional layer, a second layer representing at least one second convolutional layer and a max-pooling layer, and a third layer representing at least one third convolutional layer and at least one activation layer;

based on the output from the convolutional neural network, generating respective signal-to-interference plus noise ratio measures for respective tiles of the group of tiles based on respective distributions of respective collections of the different user equipment situated within respective sectors of the cellular network infrastructure and respective measured signal powers associated with the respective collections of the different user equipment, wherein the respective collections of the different user equipment are located in the respective sectors of the cellular network infrastructure as tessellated into the group of tiles; and based on respective locations of the different user equipment of the respective collections, generating respective predicted signal-to-interference plus noise ratios for the different user equipment.

20. The non-transitory machine-readable medium of claim 19, wherein the operations comprise receiving, from the respective collections of different user equipment, radio frequency traffic demand data, and wherein the radio frequency traffic demand data comprises a numerical value representative of the different user equipment within the respective collections that are executing network intensive application instances.

* * * * *